| United States Patent [19]
Lauw

[11] Patent Number: 5,028,804
[45] Date of Patent: Jul. 2, 1991

[54] BRUSHLESS DOUBLY-FED GENERATOR CONTROL SYSTEM

[75] Inventor: Hian K. Lauw, Corvallis, Oreg.

[73] Assignee: The State of Oregon acting by and through the State Board of Higher Education on behalf of Oregon State University, Eugene, Oreg.

[21] Appl. No.: 374,956

[22] Filed: Jun. 30, 1989

[51] Int. Cl.$^5$ .............................................. H02P 9/00
[52] U.S. Cl. .................................... 290/40 C; 322/32
[58] Field of Search ............... 290/40 R, 40 B, 40 C; 322/17, 20, 28, 32, 47, 59, 61, 63

[56] References Cited

U.S. PATENT DOCUMENTS

| 3,617,838 | 11/1971 | Brandt | 318/225 R |
|---|---|---|---|
| 3,781,616 | 12/1973 | Mokrytzki et al. | 318/230 |
| 3,975,646 | 8/1976 | Kilgore et al. | 307/21 |
| 4,001,666 | 1/1977 | Grenfell | 322/4 |
| 4,039,909 | 8/1977 | Baker | 318/197 |
| 4,096,557 | 6/1978 | Schwarz | 363/9 |
| 4,132,931 | 1/1979 | Okuyama et al. | 318/732 |
| 4,227,136 | 10/1980 | Roesel, Jr. | 318/701 |
| 4,249,120 | 2/1981 | Earle | 318/729 |
| 4,277,735 | 7/1981 | Okuyama et al. | 318/766 |
| 4,344,025 | 8/1982 | Okuyama et al. | 318/729 |
| 4,392,099 | 7/1983 | Kuniyoshi | 318/797 |
| 4,401,938 | 8/1983 | Cronin | 322/23 X |
| 4,426,611 | 1/1984 | Espelage et al. | 318/803 |
| 4,455,522 | 6/1984 | Lipo | 318/809 |

(List continued on next page.)

OTHER PUBLICATIONS

K. Oguchi and H. Suzuki, "Speed Control of a Brushless Static Kramer System," IEEE Transactions on Industry Applications, vol. IA-17, No. 1, Jan./Feb. 1981, pp. 22-27.

J. L. Hunt, "A New Type of Induction Motor," Proc. IEE, vol. 39, pp. 648-667, 1907.

F. Creedy, "Some Developments in Multi-Speed Cascade Induction Motors," Proc IEEE, vol. 59, pp. 511-532, 1921.

(List continued on next page.)

Primary Examiner—A. D. Pellinen
Assistant Examiner—W. E. Ducanson, Jr.
Attorney, Agent, or Firm—Klarquist, Sparkman, Campbell, Leigh & Whinston

[57] ABSTRACT

An energy conversion generation system receives energy from a resource and converts the energy into electrical power for supply to a polyphase electric power grid operating at a system frequency. A prime mover driven by the resource energy and a converter, such as a power electronic converter, for produces excitation power from power received from a converter power source. A brushless doubly-fed generator has a rotor with rotor windings and a stator with stator windings comprising first and second polyphase stator systems. The rotor is driven by the prime mover. The first stator system supplies the electrical power to the grid, and the second stator system receives the excitation power from the converter. A sensor senses a parameter of the electrical power output supplied to the grid and produces a sensor signal corresponding to the sensed parameter. A controller controls the converter in response to the sensor signal. The controller establishes a reference signal, then processes the sensor signal with the reference signal to produce a controller signal. The converter produces the excitation power at an excitation frequency in response to the controller signal so as to increase the ratio of the electrical power output to the resource energy power input received by the prime mover.

A related method of converting resource energy from a resource into electrical power for supply to the grid is also described. A frequency source generator, a generator system, a variable speed generation system controller and a related control method are each described.

35 Claims, 11 Drawing Sheets

U.S. PATENT DOCUMENTS

| | | | |
|---|---|---|---|
| 4,476,424 | 10/1984 | Kalman | 318/832 |
| 4,517,467 | 5/1985 | Führing | 290/44 |
| 4,672,298 | 6/1987 | Rohatyn | 323/208 |
| 4,694,189 | 9/1987 | Haraguchi et al. | 290/40 C |
| 4,701,691 | 10/1987 | Nickoladze | 322/32 |
| 4,710,692 | 12/1987 | Libert et al. | 318/729 |
| 4,723,104 | 2/1988 | Rohatyn | 318/813 |
| 4,743,777 | 5/1988 | Shilling et al. | 322/61 X |
| 4,757,240 | 7/1988 | Mizobuchi et al. | 318/52 |
| 4,791,309 | 12/1988 | Payne et al. | 290/40 R |
| 4,794,316 | 12/1988 | Uchino et al. | 322/47 |
| 4,806,781 | 2/1989 | Hochstetter | 290/43 |
| 4,816,696 | 3/1989 | Sakayori et al. | 290/52 |

OTHER PUBLICATIONS

A. R. W. Broadway and L. Burbridge, "Self-Cascaded Machine: A Low-Speed Motor or High-Frequency Brushless Alternator," Proc IEE, vol. 117, No. 7, pp. 1277–1290, Jul. 1970.

A. Kusko and C. B. Somuah, "Speed Control of a Single-Frame Cascade Induction Motor with Slip-Power Pump Back," IEEE Transactions on Industrial Applications, vol. IA-14, No. 2, pp. 97–105, 1978.

H. K. Lauw, "Characteristics of the Doubly-Fed Machine in a Hydro Variable-Speed Generation System," Final Report, USDOE Bonneville Power Administration Contract No. 79-85BP24332, Jun. 1986.

H. K. Lauw, "Variable-Speed Generation with the Series-Resonant Converter," Final Report, USDOE Bonneville Power Administration Contract No. 79-85BP24332 Mod-1, Jan. 1987.

Power Technologies, Inc., "Variable Rotor Speed for Wind Turbines: Objectives and Issues," EPRI AP-4261, Sep., 1985.

M. Ohi and J. C. Kaskian, "Dynamic Characteristics and Speed Feedback Stabilization of the Doubly Fed Machine," IEEE Paper A76 413-5, Power Engineering Society, Portland, Ore., 1976.

FIG. 11
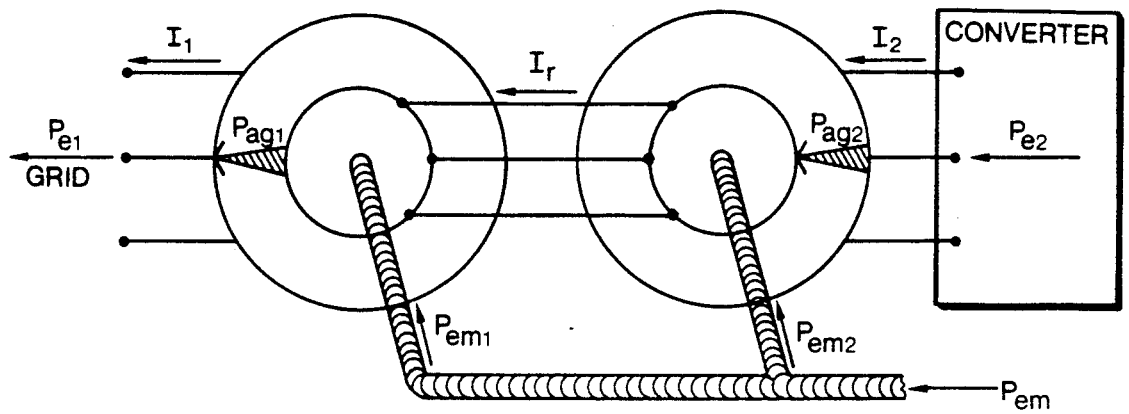
FIG. 12
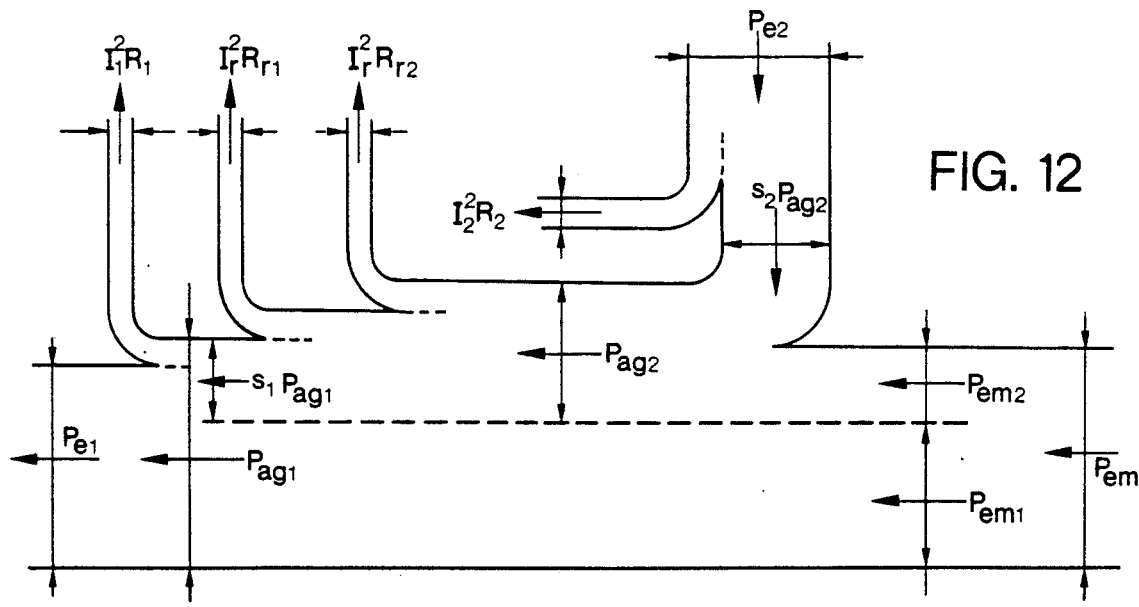
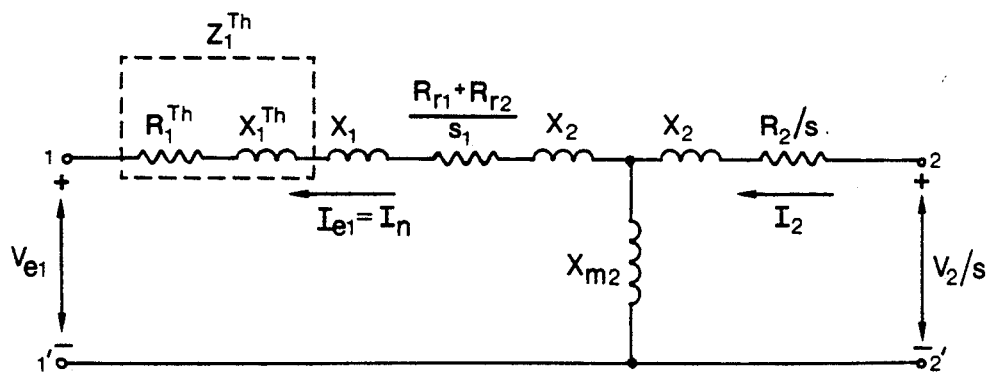
FIG. 13

BRUSHLESS DOUBLY-FED GENERATOR CONTROL SYSTEM

This invention was made with government support under Grant No. 79-85BP24332, awarded by the Bonneville Power Administration. The United States government has certain rights in this invention.

BACKGROUND OF THE INVENTION

This invention relates generally to energy conversion systems for generating electricity and to methods of controlling such systems, and more particularly to a variable speed generation (VSG) system and control method utilizing a brushless doubly-fed generator which operates in both an induction mode and a synchronous mode. Such a brushless doubly-fed machine has a winding structure different than four other known types of electrical machines.

First, a synchronous machine typically has one set of polyphase power windings on a stator which are connected to a grid. The synchronous machine has DC (direct current) field or excitation rotor windings terminating at slip rings on the rotor. Via the slip rings, the excitation windings are connected by brushes to an external DC excitation source. Such brushes require periodic maintenance and replacement, which typically requires that the synchronous machine be disconnected from the power grid and the rotor brought to essentially a standstill. The brushes and slip rings also increase the electrical losses of the machine which detracts from the overall machine efficiency.

A synchronous machine is restricted to operation at a particular synchronous speed, and if torque requirements are exceeded the machine will lose synchronism, commonly referred to as "slipping a pole." Thus, a synchronous generator is not well suited to variations in the resource energy received from an inherently variable resource, such as hydro or wind.

Secondly, an induction machine also has polyphase power windings on a stator which are connected to a grid. The induction rotor may be either a wound rotor having rotor windings or a squirrel cage rotor having conducting bars embedded in slots on the rotor and interconnected at each end by conducting rings. An induced polyphase current circulates through the wound rotor windings or the squirrel cage rotor bars.

An induction generator suffers from several major limitations, including an inflexible nature concerning speed variation. Speed control by varying the rotor resistance is inefficient. Speed control by varying the stator voltage and/or the stator frequency requires a power electronic converter having the same rating as the generator, placed between the stator terminals and the electric power grid. Thus, such a power electronic converter carries the full load current, which increases the operating costs due to power losses within the converter, as well as the initial cost of purchasing the system. Moreover, an induction generator requires a reactive power input. Thus, additional equipment is required, such as a static VAR system, which further increases the initial and operating costs. As a further disadvantage, the induction generator is inherently incapable of generating a reactive power output.

Thirdly, a hybrid electrical machine is a doubly-fed generator with brushes which has a stator with polyphase power stator windings connected to a grid. The hybrid doubly-fed machine has a wound rotor with polyphase excitation rotor windings terminating at slip rings. Via the slip rings, the rotor windings are connected by brushes to an external energy converter. This varies from the synchronous and induction machines discussed above, in that the energy converter varies the amplitude and frequency of AC rotor current or voltage to control the rotor speed and the output characteristics of doubly-fed machine. A controller monitors various system inputs and outputs, and according to a desired control strategy provides amplitude and frequency control signals to the energy converter. Such a doubly-fed generator is described in a pending United States application, of which the inventor of the present application is one of the coinventors, entitled "Doubly-fed Generator Variable Speed Generation Control System", Ser. No. 07/304,044.

However, this hybrid doubly-fed machine requires brushes to transfer the excitation power from the energy converter to the polyphase rotor windings. The same disadvantages of brushes used on synchronous machines are also present in the hybrid doubly-fed machine, namely: maintenance and replacement costs including parts, labor and machine down-time; and decreased efficiency from the additional electrical loses imposed by the brushes and the brush/slip ring interface.

Finally, a cascade induction motor for low speed operation was developed in the late 1800's. The original cascade machine was a two-frame machine comprising two wound rotor induction motors mechanically coupled together and coupled to the load. The primary motor slip power, that is the power extracted from the rotor windings of the primary machine, excites either the secondary machine stator windings or the rotor windings via slip rings and brushes. When the rotor of the secondary machine is excited, external resistances are added to the stator windings to control the speed. A rectifier-invertor returns the excess slip frequency power to the grid. By adjusting the invertor firing angle, the effective voltage and slip as seen from the secondary machine stator terminals is varied.

Brushless machines having two sets of polyphase stator systems with separate or shared common stator windings, and a squirrel cage rotor, have been studied and proposed by others in the past, particularly in the motor context. However, the extent of these studies has been to the use of the machine in a singly fed mode, that is, an induction mode. Any attempts at synchronous operation were limited to a single synchronous speed.

These prior studies and papers, discussed further below, are vague on the design aspects of the brushless machine, especially concerning the pole pitch of the windings. Generally, these machines had one set of stator windings connected to a power grid, and the other set of stator windings connected to a bank of variable resistors which were used to control the machine speed. The electrical losses produced by these resistors resulted in a very inefficient machine. Additionally, the use of the brushless machine in a singly fed or induction mode resulted in a poor power factor.

Power factor refers to the relative phases in the time domain of the waveforms of the polyphase AC voltage and current. For example, unity power factor is achieved when the waveforms of the polyphase AC voltage and current are in phase, that is, neither waveform is leading or lagging the other waveform. Operation at a poor power factor, such as a lagging or inductive power factor wherein the current waveform is lagging in time behind the voltage waveform, results in greater electrical losses within the machine, as well as on the lines feeding the machine, which detract from the overall machine efficiency.

The first discussion of which the inventor is aware of a brushless machine having two sets of three phase stator systems with common windings appears in a 1907 article by Hunt. (J. L. Hunt, "A New Type of Induction Motor," *Proceedings of the IEE,* Vol. 39, pp. 648-667, 1907.) A new induction motor was proposed by Hunt to overcome the limitations of prior single frame cascade induction motor designs.

The motor described by Hunt has a stator with a single stator winding having terminals for connection to a grid. The stator windings are grouped in parallel circuits and have taps, but are otherwise of the ordinary type. The parallel circuits are shared by each of the two three phase systems. The taps are connected in pairs through resistances during starting or during rheostatic speed control, and the taps are short-circuited at normal speed. This varies from the start-up control of the torque and speed of a conventional slip ring motor wherein the resistances are connected to the rotor windings by the slip rings, and not to the stator windings.

The rotor of the Hunt motor has a short-circuited winding comprising shorted rotor bars. This provides a rotor which is mechanically simple and approximates the construction of a squirrel cage rotor which is commonly used in induction motors. If the rotor has no slip rings, that is, a brushless rotor, the motor runs at one efficient speed. The Hunt motor may operate at two, three or four efficient speeds by using slip rings and varying the number of rotor poles with an external switching means. Thus, the Hunt motor does not operate at any desired speed, but only at a few fixed speeds.

The Hunt article also discloses that if continuous or DC current is supplied to one set of stator windings and AC current to the other set, the motor will run at one single synchronous speed like a conventional synchronous motor. In this case, the machine is started from a standstill as an induction motor until normal speed is reached. At this point, the DC current is applied to one set of stator windings by closing a switch, and the motor pulls into step for operation at synchronous speed. The Hunt motor does not operate at variable speeds while operating in a synchronous mode.

In a 1921 article by Creedy, additional developments in multi-speed cascade induction motors were examined, including faster motors, and those having a greater number of discrete stepped speeds with smaller intervals between them. (F. Creedy, "Some Developments in Multi-Speed Cascade Induction Motors," *Proceedings of the IEE,* Vol. 59, pp. 511-532, 1921.) In a conventional manner, intermediate speeds between the discrete steps are obtained by adding resistance to the rotor windings across the slip rings. Such resistances, of course, detract from the overall machine efficiency by nonproductively consuming power and dissipating it as heat ($I^2R$ losses).

Basically, Creedy proposed a design method which removed some of the limitations of the Hunt design method. Creedy proposed two systems of stator windings, one having two poles and the other having six poles. In the discussion after the article, Hunt approves of the Creedy method and proposes using the two plus six pole stator winding configuration of Creedy with a brushless ("without slip-rings") rotor to obtain a commercial motor which runs at 750 rpm.

In a 1970 paper by Broadway and Burbridge, the rotor design of the Hunt induction motor was improved upon by producing a more efficient, robust, and economical squirrel-cage rotor. (A.R.W. Broadway and L. Burbridge, "Self-Cascaded Machine: A Low-Speed Motor or High-Frequency Brushless Alternator," *Proceedings of the IEE,* Vol. 117, No. 7, pp. 1277-1290, July, 1970.) The Broadway/Burbridge machine is a self-cascaded single-frame unit which operates in a manner equivalent to a two-machine arrangement, where one machine would have two p-poles, and the other machine, two q-poles. The fields of each machine share a common magnetic circuit and the currents, which are normally separate, share the same windings. Each phase of the stator winding carries two component currents, each generally of a different frequency and flowing in different paths within the same winding. However, each phase winding in the rotor carries a single current of only one frequency.

The Broadway/Burbridge machine may run asynchronously using resistance control, or synchronously without external rotor winding connections; that is, without slip rings or rotating diodes. For synchronous operation, the two q-pole components of the single-stator winding are energized with direct current. Broadway and Burbridge refer to this as being "doubly-fed," where a single stator winding receives both alternating (AC) current and direct (DC) current. The authors emphasize that "it is clearly desirable that no alternating current should flow in the direct-current supply, and vice versa." Thus, Broadway and Burbridge's use of the term, "doubly-fed" is quite different from that used herein to describe a preferred embodiment of the subject invention.

The Broadway/Burbridge rotor is a multicircuit single-layer winding with each slot containing only one conductor. A single rotor winding may be formed by a U-shaped conductor occupying two slots, with the ends of the U-shaped conductor shortcircuited by a squirrel-cage end ring. Several such U-shaped windings of increasing size may be grouped concentrically in adjacent rotor slots. For example, the innermost U-shaped winding may have one slot between the legs of the U-shaped coil, and this central slot may be left unoccupied. Thus, the Broadway/Burbridge rotor is simple to construct and highly durable or robust.

To avoid an unbalanced magnetic pull which occurs when two fields differ by only two poles, Broadway and Burbridge state that it is "essential" that the two main fields differ by a minimum of four poles. The highest speed operation of this machine as a motor, and the lowest frequency output as an alternator, exist when the two fields are of six poles and two poles. For example, four such groups of concentric U-shaped windings may be used for a (6+2)-pole rotor winding.

In a 1978 article, Kusko and Somuah proposed speed control of a self-cascade single-frame brushless induction motor using a frequency converter comprising a DC-linked rectifier-invertor. (A. Kusko and C. B. Somuah, "Speed Control of a Single-Frame Cascade Induction Motor with Slip-Power Pump Back," *IEEE Transactions on Industrial Applications,* Vol. IA-14, No. 2, pp. 97-105, 1978.) The frequency converter provides slip recovery or slip-power pump back; that is, excess power not required at a particular speed is fed back into the grid which supplies power to the motor. This motor comprises two wound-rotor induction motors which are built on a common set of core laminations within a single motor frame. The rotor windings of these two motors are interconnected on the single rotor to form a self-cascade system. The rotor has no slip rings or brushes and each rotor winding is described as consisting of one squirrel-cage bar and two short-circuited single conductor coils.

The stator has two sets of stator windings. The primary stator winding has the greater number of poles, for example four, and is connected to the grid. The secondary stator winding has the lesser number of poles, such as two, and is connected to the solid-state rectifier-invertor. The synchronous speed of the motor is set by the sum of the pole pairs of the primary and secondary stator windings. Thus, synchronous operation occurs at a single synchronous speed.

The Kusko/Somuah motor achieves a speed variation by removing the excess power from the stator through the secondary windings and applying it to the rectifier-invertor of the frequency converter. The power as received by the rectifier- invertor is AC and appears in a variety of frequencies. The rectifier portion of the frequency converter rectifies this wild frequency AC power into DC power which travels through a DC link to the invertor. The invertor portion then converts the DC power into AC power at the grid frequency for supply back into the power grid. Thus, there is no real control of the motor, just a recovery of the surplus power not required by the motor. According to the authors, the maximum benefit of the slip-energy recovery system is only attained at low speeds.

Kusko/Somuah state that operation of their device as a generator is impossible due to the unidirectional properties of the bridge rectifier diodes. However, if this limitation were overcome, operation as a generator occurs above a certain maximum speed only if there is a power reversal from the invertor to the rectifier in the DC link. That is, output power flows out of the primary (four-pole) stator winding and into the grid. This output power is equal to the total slip-frequency power flow into the secondary (two-pole) stator winding plus the mechanical power received from the turbine less the electrical and mechanical losses.

The Kusko/Somuah motor suffers from several limitations which would apparently limit a generator of the Kusko/Somuah design. For example, the frequency converter must be sized to handle the slip power which is proportional to the maximum slip times the load torque. Such a large frequency converter increases the cost of the overall system. Only the wide-speed range drives are capable of being started with the frequency converter. However, these wide-speed range drives suffer from a reduced power factor at part speed.

The Kusko/Somuah motor is unsuitable for driving varying mechanical loads. From an examination of the equations given by the authors, it is apparent that if the mechanical load driven by the motor varies, the speed of the motor will also vary. That is, such load variations will cause a shift in the torque-speed characteristic of the motor. Correction of this torque-speed characteristic requires injecting a voltage. That is, the voltage is injected at the second set of stator three phase systems. Therefore, control of the Kusko/Somuah motor also requires a speed control feedback loop, which monitors the shaft speed and supplies firing control to the frequency converter. Finally, the slip power control method not only requires reactive power for the converter, but also renders it impossible for the generator to generate reactive power. This is essentially because this method operates the machine in a singly-fed mode, i.e. the machine behaves like a conventional induction machine.

Thus, a need exists for a new VSG system, controller and method of controlling such a system to exploit the attractive features of a brushless doubly-fed generator, and to provide electrical power at a maximum efficiency from an energy source, such as the variable alternative energy resources of hydro and wind.

SUMMARY OF THE INVENTION

A VSG system converts available energy from a resource, such as steam, hydro or wind, into variable speed rotational mechanical energy with a turbine. The mechanical energy is converted into electrical energy by a brushless doubly-fed generator. The electrical energy is supplied to a load, such as an electric power grid operating a system frequency. The brushless doubly-fed generator of the present invention is a single-frame brushless doubly-fed electrical machine having a squirrel-cage rotor, resembling a conventional induction machine squirrel cage rotor, and a stator with stator windings comprising first and second polyphase stator systems. The first and second stator systems may be physically separate windings on the stator, or the first and second stator systems may share common windings. With common stator windings shared between the first and second stator systems, different currents or voltages having different frequencies are applied to the terminals of each stator system. For example, the first stator system serves as power windings which are connected to the grid, while the second stator system serves as excitation windings which are connected to an energy convertor in accordance with the present invention.

It is an overall object of the present invention to provide an improved variable speed generation (VSG) system using a brushless doubly-fed generator, and to provide an associated control method which maximizes the efficiency of operation of the system irrespective of varying resource conditions.

A further object of the present invention is to provide an energy conversion generation system and an associated method for receiving resource energy from a resource and converting the resource energy into electrical power for supply to a polyphase electric power grid operating at a system frequency, so as to increase the ratio of the electrical power output of the system to the resource energy power input.

Another object of the present invention is to provide a frequency source generator for a monitored turbine-generator set generating an electrical power output for supply to an electrical power grid operating at a system frequency.

Still a further object of the present invention is to provide a variable speed generation system controller for controlling a variable speed generation system which converts resource energy received from a resource into electrical power so as to supply a desired electrical power output to an electrical power grid irrespective of variations in the resource energy.

An additional object of the present invention is to provide a method of controlling a variable speed generation system having a brushless doubly-fed generator, a converter and a prime mover.

Yet another object of the present invention is to provide a generator system for receiving mechanical energy from a prime mover and for generating from the received mechanical energy an electrical power output according to a controller signal which is received by the generator system.

A further object of the present invention is to provide a variable speed generation system having a brushless doubly-fed generator with a brushless rotor unit, wherein the speed of the rotor is controlled by electrical means.

Another object of the present invention is to provide a variable speed generation system that is economical to manufacture and requires less maintenance to operate than conventional generation systems.

Still a further object of the present invention is to provide a variable speed generation system having a brushless doubly-fed generator and a power electronic converter which supplies excitation power to the generator at a fraction of the generator rating.

Yet another object of the present invention is to provide a variable speed generation system which is economically competitive with fixed speed generation systems.

An additional object of the present invention is to provide a variable speed generation system having a converter and a brushless doubly-fed generator with stator windings comprising a first system of power windings and a second system of excitation windings, with each system sharing common stator windings with the other system, wherein the generator exhibits frequency separation of the power carried by the common stator windings at the terminals of each of the first and second stator systems.

A further object of the present invention is to provide a variable speed generation system having a converter supplying excitation power to a brushless doubly-fed generator, wherein any harmonics generated by the converter are isolated from the voltage and current waveforms supplied to an electrical power grid by the generator.

Yet another object of the present invention is to provide a variable speed generation system having a converter, and a brushless doubly-fed generator which operates in both a synchronous mode and an induction mode.

An additional object of the present invention is to provide a method of controlling a variable speed generation system having a converter and a brushless doubly-fed generator, wherein the method provides stable synchronous operation of the generator irrespective of variations in a resource energy which is received by a turbine driving the generator.

Still a further object of the present invention is to provide a method and system of controlling a brushless doubly-fed generator to meet the excitation requirements of the generator irrespective of changing resource conditions encountered by a turbine driving the generator.

A further object of the present invention is to provide a variable speed generation system having a converter and a brushless doubly-fed generator capable of synchronous operation over a large speed region.

Another object of the present invention is to provide a variable speed generation system having a brushless doubly-fed generator which is capable of synchronization at any speed, including zero speed synchronization.

An additional object of the present invention is to provide a method of controlling a brushless doubly-fed generator in a synchronous mode of operation over the entire speed range of the generator, including speeds substantially near zero revolutions per minute.

Yet another object of the present invention is to provide a variable speed generation system which is immune to synchronization pullout, which occurs when the torque requirements required to generate the electric load supplied to a grid exceed the torque input to the generator supplied by a turbine driven by a resource.

Yet another object of the present invention is to provide a variable speed generation system having a brushless doubly-fed generator which is stable in operation and substantially immune to instability problems.

A further object of the present invention is to provide a variable speed generation system controller and an associated method for controlling a brushless doubly-fed generator which receives excitation from a converter, wherein the controller and method are capable of flexibly interfacing with a variety of power electronic converters which may be supplied by different converter manufacturers.

To accomplish the above and other objects, in accordance with the present invention an energy conversion generation system is provided for receiving resource energy from a resource and converting the resource energy into an electrical power output for supply to a polyphase electric power grid operating at a system frequency. The energy conversion generation system includes a prime mover driven by the resource energy and converter means for producing excitation power from power received from a converter power source. The energy conversion generation system also includes a brushless doubly-fed generator having a rotor with rotor windings and a stator with stator windings comprising first and second polyphase stator systems. The rotor is coupled to and driven by the prime mover. The first stator system is electrically connected to the electric power grid for supplying the electrical power output to the grid. The second stator system is electrically connected to the converter means for receiving the excitation power. The energy conversion generation system also has sensor means for sensing a parameter of the electric power output supplied to the grid and for producing a sensor signal that corresponds to the sensed parameter. The energy conversion generation system also includes controller means for controlling the converter in response to the sensor signal. The controller means includes reference means for establishing a reference signal, and processing means for processing the sensor signal and the reference signal to produce a controller signal. The converter means mentioned above is constructed to produce the excitation power at an excitation frequency in response to the controller signal so as to increase the ratio of the electrical power output to the resource energy power input received by the prime mover.

In one embodiment of the present invention, the energy conversion generation system described above comprises the following additional items and modifications. For example, the sensor means comprises reactive power sensor means for sensing a reactive power component of the electrical power output and producing therefrom a sensor signal comprising a reactive power sensor signal. The reference means further comprises reactive power reference means for establishing a reactive power reference signal corresponding to a desired reactive power component of the electrical power output. The reference means further includes speed reference means for establishing a reference speed signal, comprising a frequency component signal, corresponding to a desired generator speed.

In further accordance with the invention, the controller means further comprises comparator means, and stabilizer means, signal generator means. The comparator means is provided for comparing the reactive power sensor signal with the reactive power reference signal to produce a differential reactive power output signal representative of the difference between the reactive power sensor signal and the reactive power reference signal. The stabilizer means comprises the above comparator means and delay means for delaying the differential reactive power output signal. The stabilizer means is provided for stabilizing the system and producing an amplitude component signal. The signal generator means receives the amplitude component signal and the frequency component signal, and is thus provided for generating the controller signal in response to the reference speed signal and the delayed differential reactive power output signal. The controller signal has amplitude and frequency components which correspond to the respective amplitude and frequency component signals.

Also in accordance with another embodiment of the present invention, the controller means further includes turbine efficiency maximizer means for maximizing the efficiency of the prime mover and producing a turbine efficiency output signal. The controller means also includes switching means for selecting one of the turbine efficiency output signal and the reference speed signal to serve as the frequency component signal.

The energy conversion generation system also includes prime mover input sensor means for sensing an input parameter of the resource energy received by the prime mover from the resource, and for producing a prime mover input sensor signal corresponding to the sensed input parameter. The system also includes output power sensor means for sensing a real component of the electrical power output and for producing a real power sensor signal corresponding to the sensed real component. The controller means further includes power demand reference means for establishing a real power demand signal, and turbine controller means for receiving and processing the real power sensor signal and the real power demand signal to produce a turbine controller signal. The turbine efficiency maximizer means is constructed to receive and process the prime mover input sensor signal and the turbine controller signal to produce the turbine efficiency output signal.

The system also includes resource energy adjustment means for receiving the turbine controller signal and for controlling the resource energy received by the prime mover in response to the turbine controller signal. In this manner, the resource energy converted into mechanical energy by the prime mover is controlled.

Embodiments are also provided for energy conversion generation systems which receive resource energy from a hydro resource and from a wind resource.

According to another aspect of the present invention, a method is provided of converting resource energy from a resource into electrical power for supply to a polyphase electric power grid operating at a system frequency. A prime mover is driven using resource energy from a resource and a brushless doubly-fed generator is driven by the prime mover. The brushless doubly-fed generator is as described above for the energy conversion generation system. In a monitoring step of the method, a parameter of the electrical power supplied to the grid is monitored and a first output power sensor signal is produced that corresponds to the monitored parameter. In an establishing step, a reference signal is established according to a desired power generation strategy. In a receiving and processing step, the first output power sensor signal and the reference signal are received and processed to produce a controller signal. In a converting step, power received from a converter power source is converted into excitation power at an excitation frequency in response to the controller signal. In an injecting step, the excitation power is injected at the excitation frequency into the second stator system. In a supplying step, an electrical power output is supplied to the grid at the system frequency from the first stator system.

According to another aspect of the present invention, a frequency source generator is provided for a monitored turbine-generator set generating an electrical power output for supply to an electrical power grid operating in a system frequency. The turbine comprises a prime mover as described above, and the generator comprises a brushless doubly-fed generator also as described above. The turbine-generator set also includes monitoring means for monitoring the input and output parameters of the turbine-generator set. The monitoring means includes reactive power sensing means for sensing a reactive power component of the electrical power output and for producing a reactive power sensor signal corresponding to the sensed reactive power component. The frequency source generator for use with the turbine-generator set comprises controller means and converter means. The controller means comprises reference means for establishing a reference signal. The controller means is provided for receiving the reactive power sensor signal and for processing the reactive power sensor signal with the reference signal to produce a converter controller signal. The converter means is provided for receiving the converter controller signal and for converting power received from a converter power source into excitation power at a controlled excitation frequency in response to the converter controller signal. The converter means is also provided for injecting the excitation power at the excitation frequency into the second stator system of the brushless doubly-fed generator.

According to yet another aspect of the present invention, a variable speed generation system controller is provided for controlling a variable speed generation system as described above. The variable speed generation system controller comprises converter controller means which include reference means for establishing a reference signal according to a desired power generation strategy. The converter controller means is constructed to receive and process the reactive power sensor signal produced by the variable speed generation system with the reference signal to produce therefrom a controller signal. The converter of the variable speed generation system is responsive to the controller signal, so as to supply a desired electrical power output to an electrical power grid irrespective of variations in a resource energy received by the variable speed generation system.

In another aspect of the present invention, a method is provided of controlling a variable speed generation system as described above. An output parameter of the electrical power output of the generation system is monitored and an output parameter signal corresponding to the monitored output parameter is produced. In an establishing step, a reference signal is established according to a desired power generation strategy. In a receiving and processing step, the output parameter signal is received and processed with the reference signal to produce a controller signal having amplitude and frequency components. In an applying step, the controller signal is applied to a converter of the variable speed generation system to control the amplitude and frequency of the excitation power produced by the converter.

In still a further aspect of the present invention, a generator system is provided for receiving mechanical energy from a turbine which is driven by a resource as described above. The generator system comprises converter means for receiving a control signal produced by a controller external to the generator system. The converter means is provided for converting power received from a converter power source into excitation power of variable frequency and amplitude in response to the control signal. The generator system also includes a generator having a brushless rotor unit with rotor windings and a stator unit with stator windings comprising first and second polyphase stator systems. The rotor is mechanically coupled to and driven by the turbine. The second stator system receives the excitation power from the converter means. The first stator system supplies an electrical power output to an electrical power grid according to the controller signal.

Thus, the present invention provides many desirable advantages and features which will be apparent from the detailed description of a preferred embodiment below. Among the advantages of the present invention, the initial cost and maintenance of the variable speed generation system of the present invention will be less than that of other conventional variable speed generation systems. The variable speed generation system uses a power electronic converter having a fraction of the brushless doubly-fed generator rating, which will advantageously result in lower initial and operating costs. The synchronous mode of operation provided by the variable speed generation system of the present invention efficiently controls the shaft speed of the VSG system. The squirrel cage rotor of the present invention is more economically manufactured than a wound rotor, resulting in lower initial costs for the generator, and thus for the VSG system. The brushless doubly-fed generator of the VSG system of the present invention is capable of operation in both synchronous and induction modes, at any speed. Advantageously, loss of the synchronous mode of operation merely causes the generator of the present invention to enter an induction mode of operation, where the shaft speed is still controllable.

These and other objects, features and advantages of the present invention will become apparent to those skilled in the art from the following description and drawings.

BRIEF DESCRIPTION OF THE DRAWINGS

FIG. 11 is a diagram illustrating the power flow in the equivalent brushless doubly-fed machine of FIG. 4, illustrated according to generator convention, that is with a mechanical power input to the rotor;

FIG. 12 is a diagram illustrating the power balance of a brushless doubly-fed machine of the present invention, with power flow illustrated according to generator convention;

FIG. 13 is a single phase equivalent diagram of a Thevenin equivalent model of the brushless doubly-fed machine of FIG. 10;

DESCRIPTION OF A PREFERRED EMBODIMENT

In this description of preferred embodiments, the following characters or variables are defined as: I = current; V = voltage; E = induced voltage; R = resistance; X = inductance; Z = impedance; P = real or active power; Q = reactive power; T = torque; f = frequency; s = slip; n = number of pole pairs; RPM = shaft speed in revolutions per minute; rms = root mean squared value of a quantity.

The following variables and numbers are used as subscripts to indicate: 1 = a first stator winding system quantity; 2 = a second stator winding system quantity; a, b and c = respective 3-phases associated with a 3-phase power system; r = a rotor quantity; e = a Thevenin equivalent quantity; em = an electromechanical quantity; ag = an air-gap quantity; x and y = the respective horizontal and vertical ordinates of a graphed quantity.

A horizontal bar above a variable indicates a phasor quantity. A superscript asterisk (*) indicates the conjugate of a value. Several other variables, subscripts and superscripts are defined in this detailed description when required.

The Variable Speed Generation System

Figure 1:
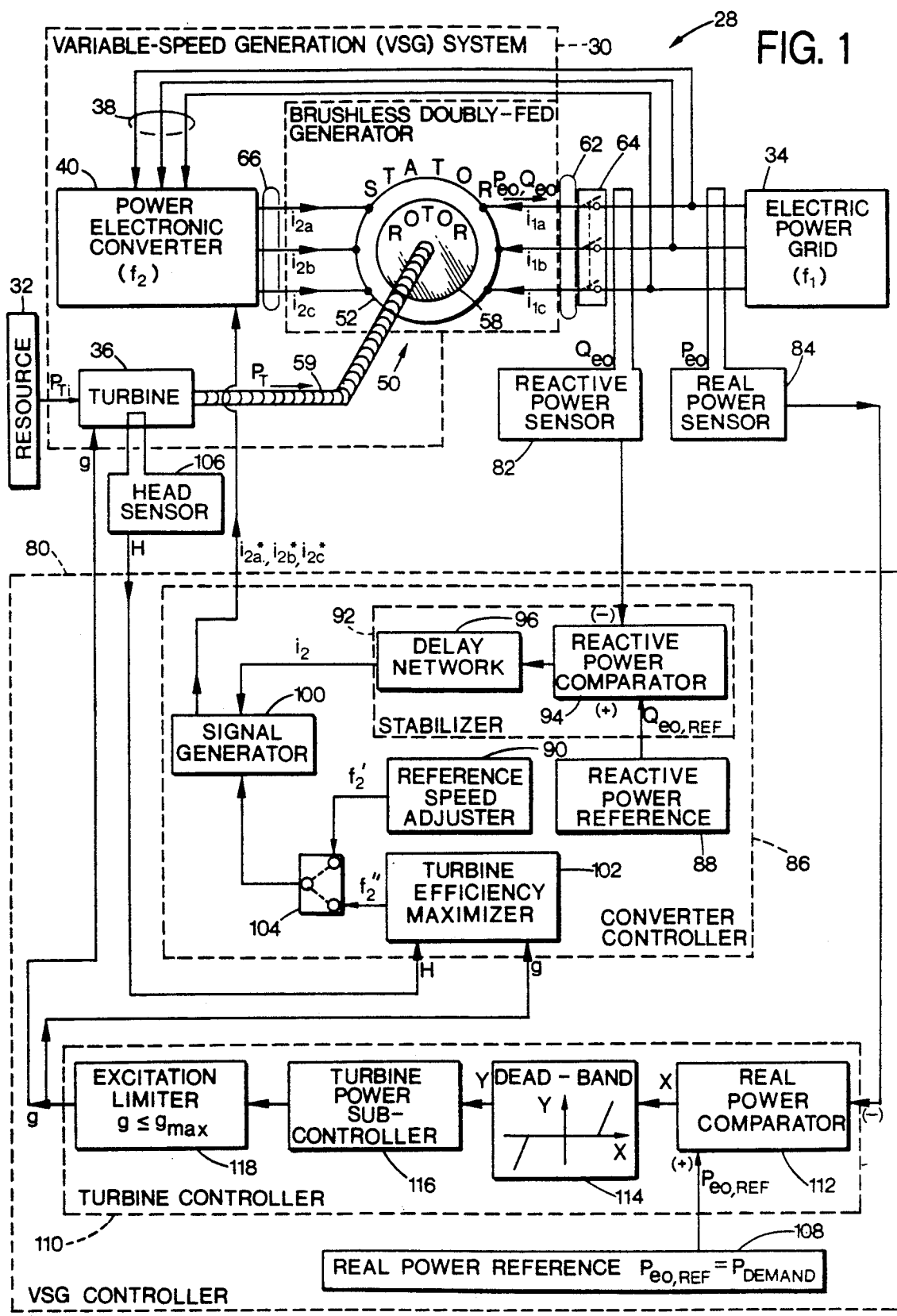
FIGS. 1 and 2 are schematic block diagrams of alternate embodiments an energy conversion generation system of the present invention including a variable speed generation (VSG) controller and a VSG system having a brushless doubly-fed generator and a converter.
Figure 2:
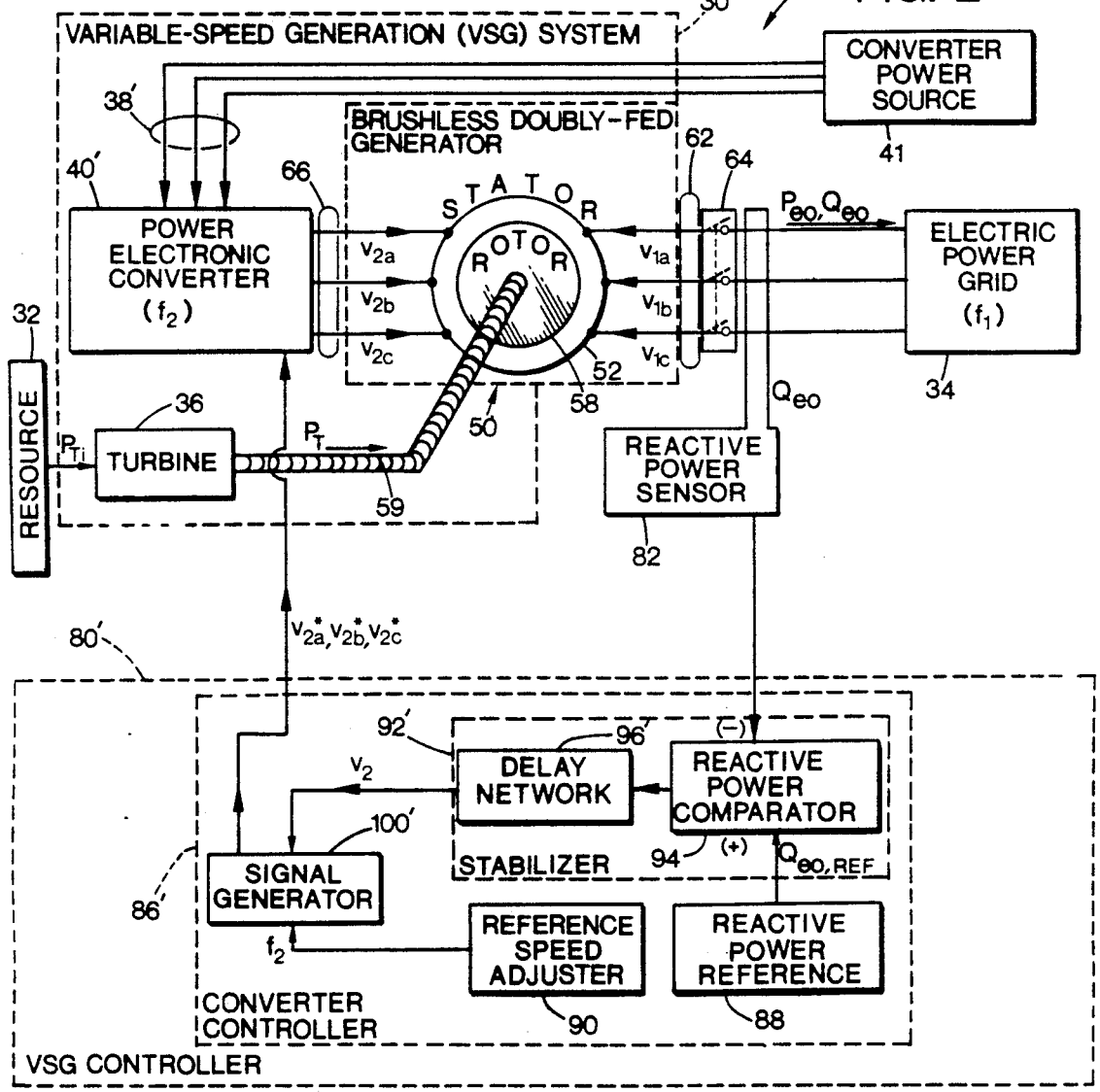

Alternate embodiments of an energy conversion generation system 28 and 28' are shown in FIGS. 1 and 2, each including a respective variable speed generation (VSG) system 30, 30' which receives resource energy $P_{Ti}$ from a resource 32. The VSG systems 30, 30' each convert the received resource energy into an electrical power output comprising real and reactive power components $P_{eo}$ and $Q_{eo}$ for supply to a polyphase electric power grid 34 at a system frequency $f_1$ of the grid 34. The VSG systems 30, 30' each include a prime mover 36, such as a hydro turbine, for receiving the resource energy $P_{Ti}$ and for converting the resource energy into mechanical energy $P_T$. (Hereinafter, unless the energy conversion generation system or the VSG system of FIG. 1 are specifically referred to, the respective item numbers 28 and 30 generally refer to the energy conversion generation systems and the VSG systems of both FIGS. 1 and 2.)

By an appropriate choice for the prime mover 36, the energy conversion system 28 of the present invention may be used to convert any one of a variety of resources into an electrical power output. For example, if the resource 32 is a fossil fuel, such as coal or oil, an auxiliary boiler system such as a steam turbine (not shown), may also be required to produce steam to drive the prime mover 36. Refined fossil fuels may also be used with other prime movers, such as a gas turbine, a reciprocating engine, or an internal combustion engine. Various alternative energy resources may also be used, such as hydro, wind and solar energy with the prime movers being respectively a hydro turbine, a wind turbine, and mirrors combined with a steam generation system to drive a turbine.

Such prime movers typically include resource energy adjustment means (not shown) responsive to a controller signal for controlling or limiting the resource energy received by the prime mover. Thus, the resource energy adjustment means controls the resource energy $P_{Ti}$ converted into mechanical energy $P_T$ by the prime mover 36. For example, a hydro turbine generally has a hydro inlet and gate means such as a gate for closing the hydro inlet in response to a gate position signal. Similarly, a steam turbine generally has variable position inlet gate valves which open and close to control the amount of steam received by the turbine. Wind turbines typically have adjustable blades with an adjustable pitch angle which is varied to control the force of the wind received by the turbine blades. Solar energy power generation systems generally have adjustable solar panels or mirrors, which may be adjusted to vary the angle of incidence of the solar rays on the panels or mirrors.

The energy conversion generation system 28, of the present invention is particularly advantageous in facilitating economical electricity production from the non-fossil alternative energy resources such as hydro, wind, geothermal and solar. These alternative energy resources are often erratic in supplying energy to the prime mover. Thus, these alternative energy resources are not well suited for driving a conventional turbine-synchronous generator set which must rotate at a single synchronous speed to produce an electrical power output. As worldwide supplies of our fossil energy resources, such as oil and coal, begin to dwindle or become more expensive to recover, the economical exploitation of these alternative energy resources is imperative.

The VSG system 30 of FIG. 1 illustrates supply or tapping means, such as electric cables 38, for tapping a portion of the electric power output supplied to the grid 34 to serve as a converter power source. The VSG system 30 further includes converter means, such as a power electronic energy converter 40, which receives power from the converter power source via the electric cables 38. Alternatively, the converter power source may be a separate connection to the electric power grid 34 (not shown), or an external excitation power source 41, as shown in FIG. 2. The external excitation power source 41 may be a separate generator, a direct current (DC) battery bank or the like, connected to the converter by supply means, such as electric cables 38'.

The converter 40 receives and converts power from the converter power source to produce excitation power at an excitation frequency $f_2$ in response to a received controller signal, discussed in further detail below. Power electronic converters may operate in a controllable current source mode, as shown by converter 40 of FIG. 1, or in a controllable voltage source mode, as shown by converter 40, of FIG. 2. In the current source mode, current amplitudes and frequencies are considered, whereas voltage amplitudes and frequencies are considered in the voltage source mode. Any type of energy conversion means, such as a rotating exciter may be used as converter 40 of the present invention. However, a power electronic converter 40, 40' is illustrated for its high response speed and flexibility. A variety of power electronic converters are commercially available, having the basic configuration of FIG. 3.

Figure 3:
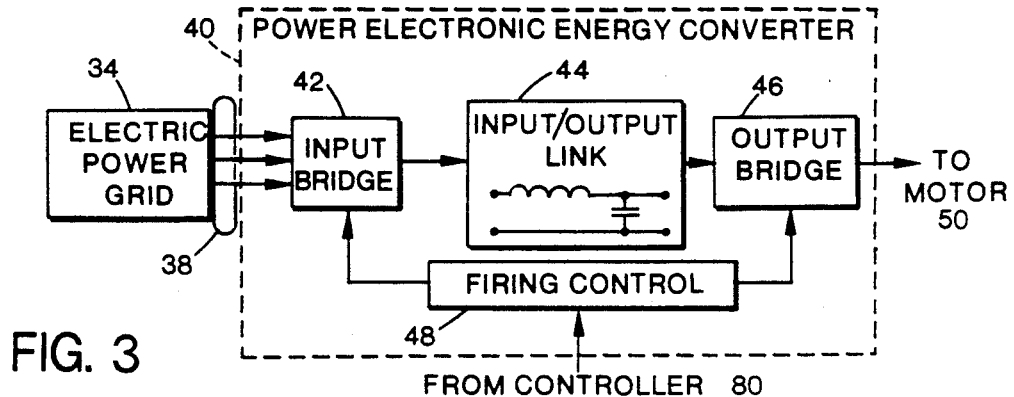
FIG. 3 is a schematic block diagram of one form of a converter of the present invention.

The converter 40 includes an input bridge 42 which receives power from the converter power source, such as grid 34, and conditions this power for input to an input/output link 44. The input/output link 44 may be a DC filter comprising a series inductor and a parallel capacitor as shown in FIG. 3. The filtered output of link 44 is supplied to an output bridge 46 which further conditions the power for use by a generator 50, described further below. The input and output bridges 42, 46 are comprised of semiconductors, such as MOSFET's, silicon controlled rectifiers (SCR's), and diodes. Although the configurations of the semiconductors in the input and output bridges vary by manufacturer, the input bridge 42 is typically a full wave or a half wave rectifier, whereas the output bridge 46 is typically an invertor bridge. Transformers (not shown) may also be included within or external to the converter 40 to step-up or to step-down the voltage as required by the particular application.

The converter 40 also includes a firing control circuit 48 which controls the time at which the semiconductors of the input and output bridges 42, 46 trigger to conduct current. The firing control circuit 48 is responsive to the controller signal, discussed below. The converter 40 may also be designed to accept an input of DC power, such as from a DC battery bank external excitation power source 41. Another example of a suitable converter is described in Schwarz U.S. Pat. No. 4,096,557.

Thus, the excitation frequency and amplitude of the converter excitation power output are controlled by the interaction of the firing control circuit 48 and the output bridge 46. The frequency may be varied from zero to several hundred Hertz or higher as required to vary the generator speed to compensate for variations in the mechanical energy $P_T$ supplied by the prime mover 36, or in the electrical demands of the grid 34. The theory of this operation is described in further detail below. Thus, the power electronic converter along with controller means described further below, may be considered as a frequency source generator for supplying excitation power of variable frequency and amplitude to a turbine-generator set comprising prime mover 36 and generator 50.

Figure 4:
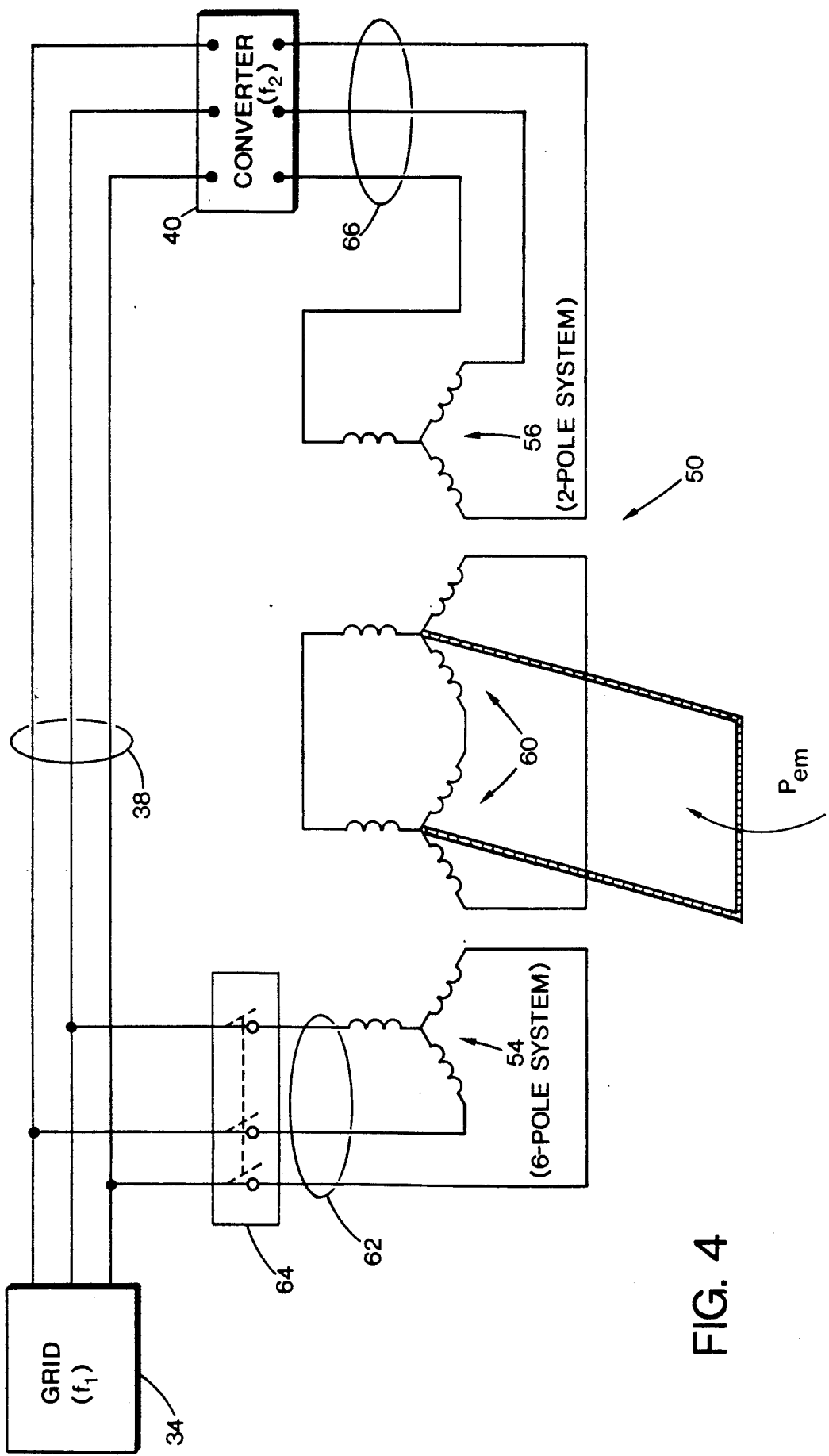
FIG. 4 is a schematic equivalent representation of a brushless doubly-fed machine of the present invention.
Figure 5A:
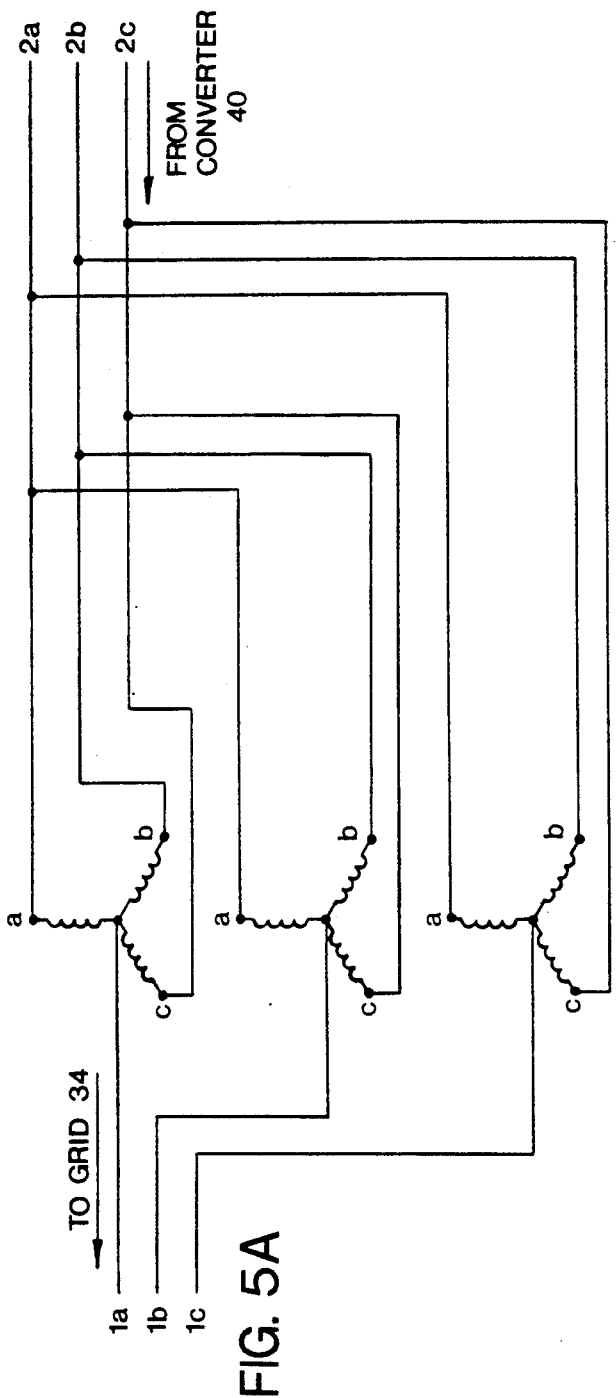
FIGS. 5A and 5B are schematic circuit diagrams of one form of the brushless doubly-fed machine of the present invention.
Figure 5B:
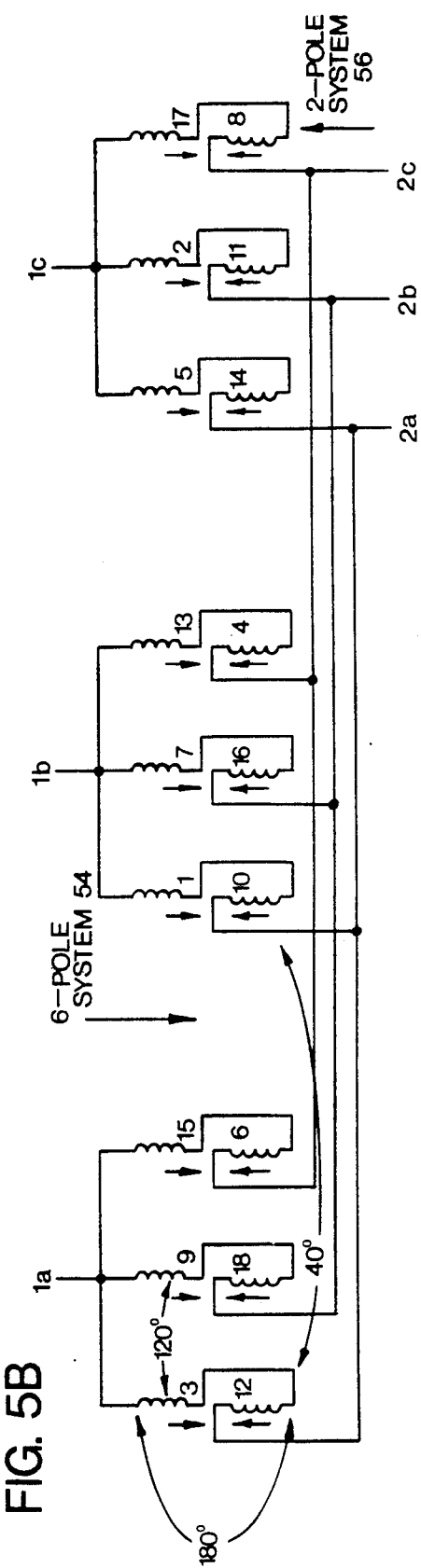

Referring to FIGS. 1, 2 and 4, the VSG system 30 includes a brushless doubly-fed generator 50 having a stator unit or stator 52 with stator windings shown schematically as the outer circle of the generator 50 (see FIGS. 1 and 2). The stator windings comprise first and second stator systems 54, 56 which may be physically separate windings on the stator. Alternatively, the first and second stator systems 54, 56 may share common windings as illustrated in FIGS. 5A and 5B. Separate stator windings are more costly than common shared windings because the separate windings require more material and yield greater operating losses. Thus, separate stator windings for the first and second stator systems increase both the initial and operating costs of such a machine. Therefore, although the system and method of the present invention may use either separate or common stator windings for the first and second stator systems 54, 56, the common stator winding machine is illustrated as the preferred embodiment.

The generator 50 also includes a brushless rotor unit or rotor 58, shown schematically as the inner circle of the generator in FIGS. 1 and 2. The rotor 58 is coupled to and driven by turbine 36 via a shaft 59. The rotor 58 has rotor windings 60 described in further detail below.

Referring to FIGS. 1, 2 and 4, the first stator system 54 supplies or delivers the electrical power output to grid 34 via electrical connection means, such as cables 62, when a switch 64, which is in series with cables 62, is closed. Switch 64 may be of any size and type suitable for the particular application, such as a power circuit breaker. The converter 40, 40' includes electrical injecting means, such as electrical cable 66, for injecting or feeding the excitation power into the second stator system 56. The injecting means may also include optional switching means (not shown).

FIGS. 1, 2 and 4 illustrate a 3-phase system embodiment, although it is apparent that the generator 50 may be designed for implementation with systems having other numbers of phases, such as a two-phase system. In the 3-phase embodiment of FIG. 1, the converter 40 operates in a controllable current source mode. Thus, the 3-phase converter 40 input to the second stator system 56 comprises the currents $i_{2a}$, $i_{2b}$ and $i_{2c}$, whereas the output of the first stator system 54 to grid 34 is shown as the currents $i_{1a}$, $i_{1b}$ and $i_{1c}$. In the 3-phase embodiment of FIG. 2, the converter 40' operates in a controllable voltage source mode. Thus, the 3-phase converter 40' input to the second stator system 56 comprises the voltages $v_{2a}$, $v_{2b}$ and $v_{2c}$, whereas the 3-phase output of the first stator system 54 is shown as the voltages $v_{1a}$, $v_{1b}$ and $v_{1c}$.

Stator Design

FIG. 5A is a schematic circuit diagram of the stator windings the illustrated 3-phase brushless doubly-fed generator 50 which supplies power to grid 34 via inputs labelled 1a, 1b and 1c. The generator receives excitation power from converter 40 via inputs labelled 2a, 2b and 2c. Note that the inputs from the qrid and converter could be in terms of current signals for converter 40 operating in a controllable current source mode (see FIG. 1), or in terms of voltage signals for converter 40' operating in a controllable voltage source mode (see FIG. 2).

In FIG. 5B, the first stator system 54 of generator 50 comprises a 6-pole winding system which supplies power to the grid 34, and the second stator system 56 comprises a 2-pole winding system which receives excitation power from the converter 40. A "pole" refers to a magnetic pole of the electric machine, such as a north, pole or a south pole, and a pole-pair comprises two-poles. Thus, the first stator system 54 has three pole-pairs and the second stator system 56 has one pole-pair.

The number of poles for each stator system are chosen so that the first stator system 54 has at least four more poles than the second stator system 56. By having the difference between the number of poles be at least four, unbalanced magnetic pull conditions in the generator are avoided. Thus, an alternate embodiment may comprise first and second stator systems having eight poles and four poles, respectively. With the second stator system having the lesser number of poles, the torque distribution is lower on the converter side of the machine.

A lower torque distribution on the converter side of the machine advantageously allows the converter 40, 40' to have a lower rating. A lower rated converter is more economical to manufacture because the components may also have lower ratings, that is, a lesser current-carrying capacity. This feature allows the AC variable speed generation system 30 to be economically attractive where previous variable speed systems were cost-prohibitive because the converter had to have the same rating as the generator.

FIGS. 5A and 5B illustrate the first and second stator systems 54, 56 as having common shared stator windings, with each coil of the stator windings carrying two current components, one for supply to grid 34 and the other received from converter 40. Generally, these two current components which flow within a given coil have different frequencies $f_1$ and $f_2$, and flow in the different paths of the same coil. Separating the frequencies of these two current components is accomplished by satisfying two conditions.

First, the stator windings are distributed in stator slots to eliminate mutual coupling between the two current components. This condition results from selecting a different number of poles for the first and second stator systems.

Second, the phase windings must be balanced, that is, of equal impedance to prevent the flow of neutral currents from one 3-phase system into the other 3-phase system. This is illustrated in FIGS. 5A and 5B as three parallel sets of 3-phase systems. The three arrows labelled 40 degrees, 120 degrees and 180 degrees in FIG. 5B depict the spacial angle of the mutual magnetic coupling between the magnetic axes of the indicated coils. Such a balanced design also advantageously prevents other undesirable side effects, such as torque pulsations caused by negative sequence currents and unbalanced loading of the grid 34.

As required by the first condition above, FIG. 5B illustrates the slot distribution of the windings to prevent mutual coupling of the two current components and to separate the frequencies of the two current components $f_1$ and $f_2$. In arranging the stator windings within stator 52, the pole-pitch may correspond with either the 6-pole system or the 2-pole system. However, if the pole-pitch is chosen on the basis of the 2-pole system, the requirement of a high magnetizing current for the 2-pole system is avoided.

Thus, for the 2-pole system, the pole-pitch spans half of the total number of stator slots. For a 36-slot stator having eighteen coil sections and slots equally spaced about the inside of the stator 52, each coil section occupies two slots. In FIG. 5B, the relative position of each coil section about the inside of the stator is indicated by the numerals 1-18 adjacent each coil section. However, the pole-pitch may be shortened, referred to as "fractional pole-pitch," to reduce undesirable harmonic effects. Thus, for a stator having 36 slots, a fractional pole pitch may span 16 slots. To smooth the magnetomotive force (MMF) waveforms, a double layer winding structure may be used.

Other design considerations may be optimized in a conventional manner by concentrating on the 6-pole system, such as minimizing losses, within the constraints of the generator rating, the winding structure, and the available slot space. The 6-pole first stator system is connected to grid 34 in the same manner as a conventional winding arrangement of an ordinary 6-pole induction machine. There are a variety of ways in which the same coils could be interconnected to form the 2-pole second stator system connected to converter 40. However, the illustrated interconnection of these coils produces a maximum flux density for a given current.

Rotor Design

Although the rotor winding 60 may be of a wound rotor design, a squirrel-cage rotor having rotor bars 68 is preferred because it is robust and more economical to manufacture than a wound rotor. Such a squirrel-cage rotor may be designed on the basis of the following theory.

Assume that the first stator system 54 has $n_1$ pole pairs which produce a first rotating stator field rotating in a first direction, and the second stator system has $n_2$-pole pairs which produce a second rotating stator field which rotates in an opposite direction. For a squirrel-cage rotor having a number of bars 68 equal to K, the first rotating stator field produces a main slot harmonic h (relative to the rotor) of:

$$h = n_1 - K.$$

For a brushless doubly-fed machine having a negative main slot harmonic h, the harmonic field rotates in a direction opposite to that of the first rotating stator field.

To produce the rotating field required for the second stator system 56, which also rotates opposite to the first rotating stator field, the main slot harmonic h is equal to the negative number of pole pairs of the second stator system ($h = -n_2$). Solving for K, the number of squirrel-cage rotor bars 68 is the sum of the number of pole pairs for the first and second stator systems, that is:

$$K = n_1 + n_2.$$

To enhance the generator performance, the rotor may include more slots than the number K for the bars 68. Shorted coils 70 may be inserted in these surplus slots between the bars, with an equal number of shorted coils being positioned between any two adjacent bars 68. In this manner, rotor leakage reactance and undesirable harmonics are advantageously reduced.

Figure 6A:
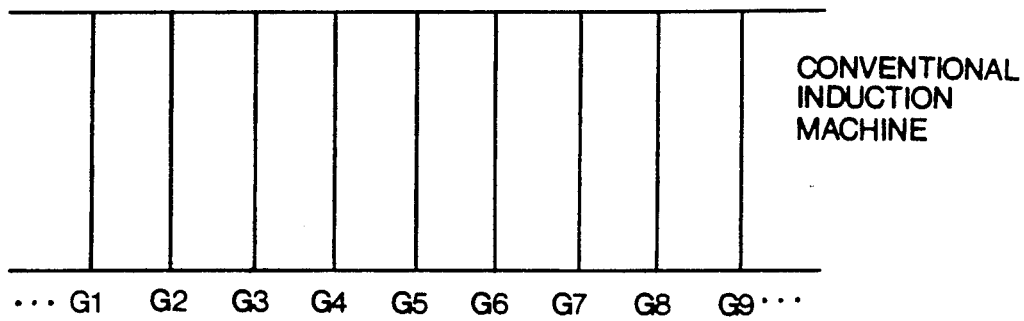
FIGS. 6A, 6B and 6C are schematic diagrams of a section of a squirrel cage rotor, with FIG. 6A illustrating a conventional induction machine rotor, and FIGS. 6B and 6C illustrating alternate embodiments for a brushless doubly-fed machine.
Figure 6B:
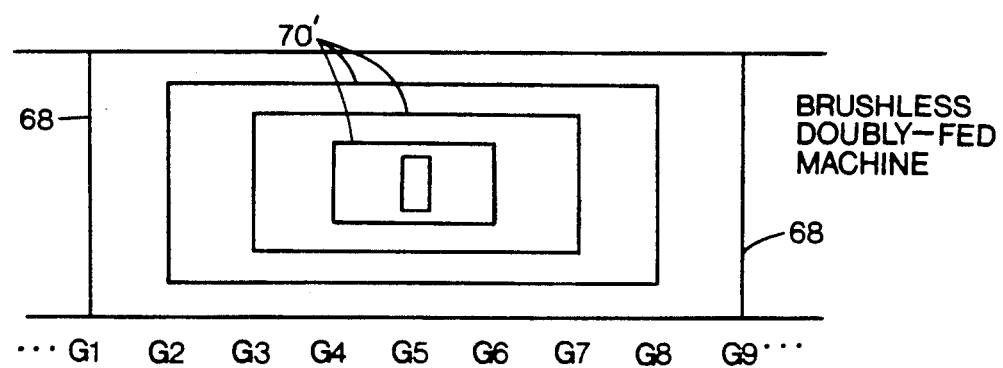
Figure 6C:
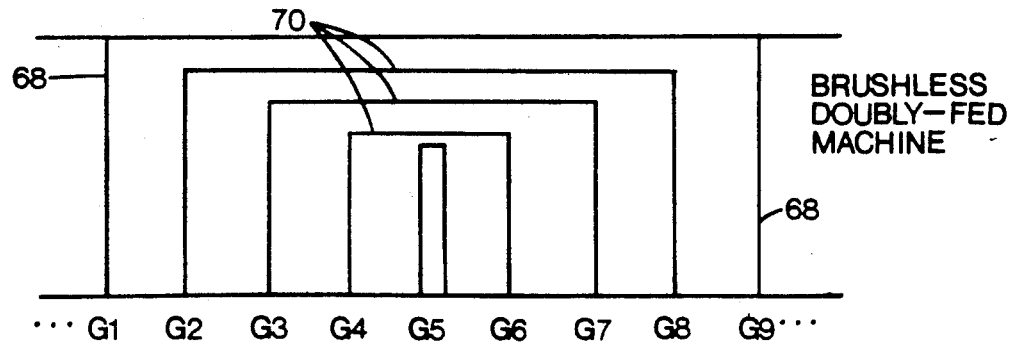

For reference, FIG. 6A shows one section of squirrel-cage rotor bars of a conventional induction machine. FIGS. 6B and 6C illustrate alternative embodiments of a section of a squirrel-cage rotor for the brushless doubly-fed machine of the present invention. In FIG. 6B, the slots numbered G1 and G9 are used for the rotor bars 68. Slots G2 through G8 may be filled with three shorted coils 70', with slot G5 left empty.

FIG. 6C illustrates a simplified version of the squirrel-cage rotor of FIG. 6B. This simplified rotor may be retrofit from a conventional induction machine squirrel-cage rotor (see FIG. 6A) by removing one of the end rings, and forming U-shaped coils 70 by shorting the appropriate rotor bars (that is, by shorting the bars in slots G2 and G8, G3 and G7, and G4 and G6, with G5 left unoccupied).

For the illustrated 6-pole and 2-pole stator systems having, respectively, three and one pole pairs, the number of rotor bars 68 is determined from:

$$K = n_1 + n_2 = 3 + 1 = 4 \text{ rotor bars.}$$

Figure 7:
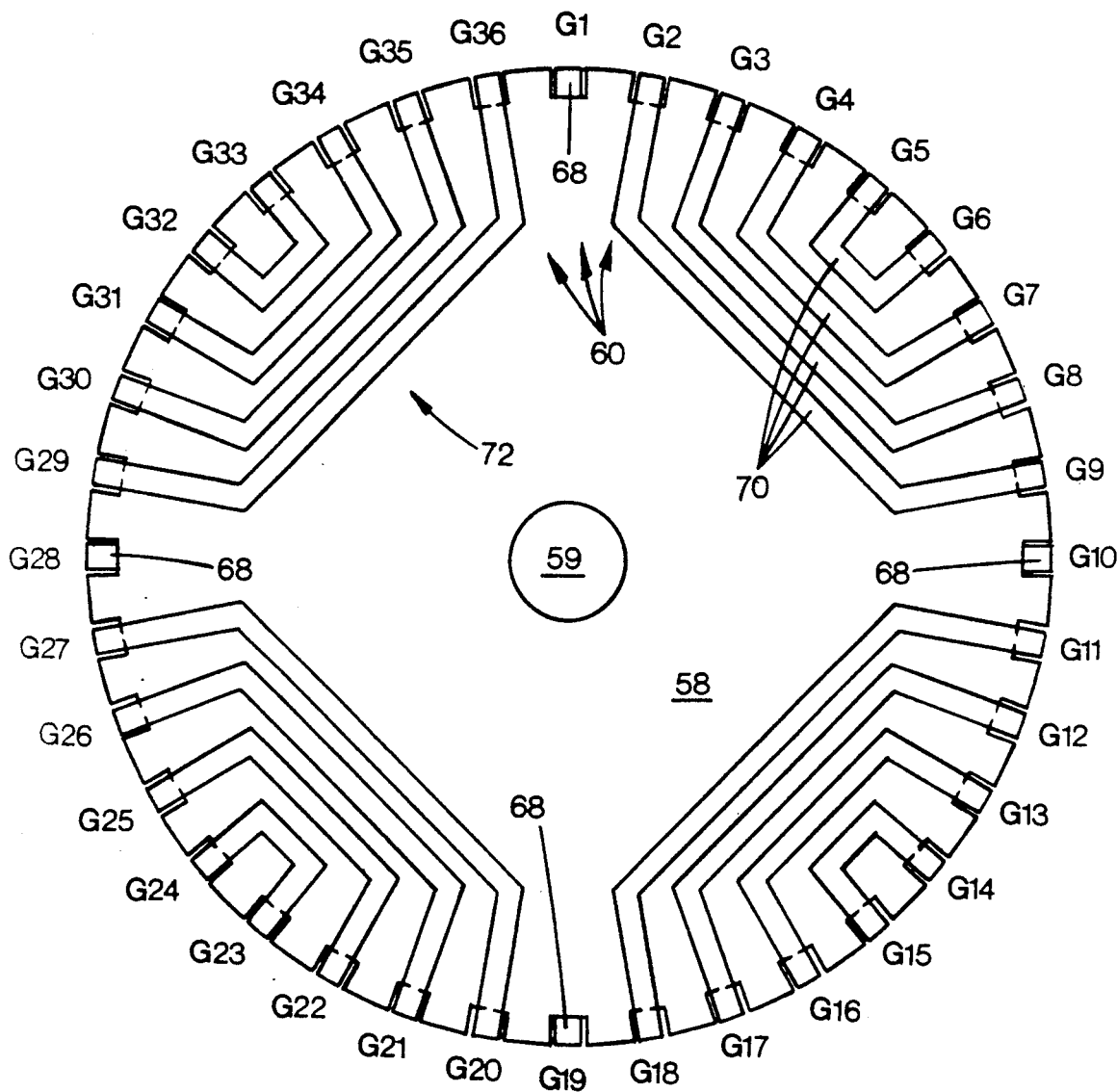
FIG. 7 is an unscaled end view of one form of a rotor of the brushless doubly-fed machine of the present invention.

Referring to FIG. 7, for example, for a 36-slot squirrel-cage rotor having sequentially numbered slots G1 through G36, the four rotor bars 68 are spread evenly over the rotor periphery, such as in slots numbered G1, G10, G19, and G28.

Groups of rotor windings 72 may be placed in the slots remaining between the rotor bars 68. For example, a rotor winding group 72 comprising four concentric shorted rotor coils 70 may be placed between any two bars, with no slot being left unoccupied. For example, between the bars in slots G1 and G10, the four shorted rotor coils occupy slots: G2 and G9; G3 and G8; G4 and G7; and G5 and G6.

Modes of Machine Operation

As mentioned briefly above, the brushless doubly-fed machine operates in a synchronous mode and in an induction mode. Other earlier machines, discussed above in the background portion of this specification, operated only in a singly-fed mode. In the singly-fed mode, only one of the stator systems is connected to a frequency source which typically is an electric power grid. The second stator system is not connected to a frequency source, but rather to a passive network or to the rectifier side of a DC-link converter.

In this configuration, the machine operates exclusively in the induction mode. The current in the first stator system having a first frequency $f_1$ of the grid induces a rotor current having a rotor current frequency $f_1$. The rotor current frequency $f_1$ induces a current in the second stator system with a second frequency $f_{s2}$. Thus, the second stator system frequency $f_{s2}$ is imposed by the induction phenomenon, and not by an injected supply frequency. Furthermore, the shaft speed or RPM of a singly-fed machine depends upon the matching of the machine's torque-speed characteristic with the torque-speed characteristic of the prime mover.

In the doubly-fed mode of the present invention, the first and second stator systems 54, 56 are each connected to independent frequency sources, i.e., $f_1$ and $f_2$, each of which are truly a supplied frequency. The 6-pole first stator system is connected to the power grid 34 which operates at a system frequency such as 60 Hz and, therefore, $f_1=60$ Hz. The 2-pole second stator system is connected to the converter 40, 40' which supplies excitation power with a controllable frequency $f_2$. The doubly-fed induction and synchronous modes of operation for this embodiment are now discussed in greater detail.

(a) Doubly-Fed Induction Mode of Operation

Even though the doubly-fed machine of the present invention is constructed with common stator windings, as well as common rotor conductors, the machine performs in a manner equivalent to the system illustrated in FIG. 4. The equivalency of the machine in FIG. 4 is apparent from the frequency separation of the first and second stator systems which are not mutually coupled due to the stator winding arrangement discussed above (see FIG. 5B).

This equivalent representation of FIG. 4 depicts two conventional induction machines which share a common rotor winding and a common shaft. The stator of the first machine is connected to grid 34 and, thus, is designated as having the first stator system 54. The stator of the second machine is connected to the converter 40 and, thus, carries the second stator system 56. The rotor windings 60 of FIG. 4 are connected so that a single current flowing in the rotor conductors causes the rotational rotor fields of the 6-pole machine and the 2-pole machine to rotate in opposite directions.

For example, assuming the shaft rotation to be clockwise (CW) and the rotor rotational field associated with the 6-pole system to be clockwise, the rotor rotational field associated with the 2-pole system is counter-clockwise. Also assume a positive rotation of the 6-pole first stator system current to be in a clockwise direction and a positive rotation of the 2-pole second stator system current to be counterclockwise.

A basic law of electromechanical energy conversion states that under steady-state operating conditions, the stator and rotor rotational fields must rotate at the same angular speed. Consequently, from the above assumptions and this basic steady-state operating condition law:

$$f_1 = n_1 f_m + f_{r1},$$

$$-f_2 = n_2 f_m - f_{r2},$$

with the shaft speed in RPM $= 60 \times f_m$.

In these relationships the symbols $f_1$ and $f_2$ are respectively the supply frequencies in Hertz to the stator 6-pole and stator 2-pole systems 54, 56; $f_m$ is the angular shaft speed in mechanical radians per second; $n_1$ and $n_2$ are the number of pole pairs and are respectively equal to 3 and 1; $f_{r1}$ and $f_{r2}$ are the frequencies of the rotor currents induced by the respective first and second stator systems 54, 56. Now, adding the above equations gives an explicit formula for the shaft speed according to:

$$RPM = 60 \times f_m = (60)[f_1 - f_2 - (f_{r1} - f_{r2})]/(n_1 + n_2).$$

From this equation, it is apparent that the shaft speed depends upon the mechanical loading characteristics. Since the supply frequencies $f_1$ and $f_2$ are fixed, the rotor frequencies $f_{r1}$ and $f_{r2}$ vary with changes in the mechanical loading. Given a mechanical loading torque-speed characteristic, stable operation at a certain shaft speed results when the machine matches the torque-speed characteristics of the prime mover.

Figure 8:
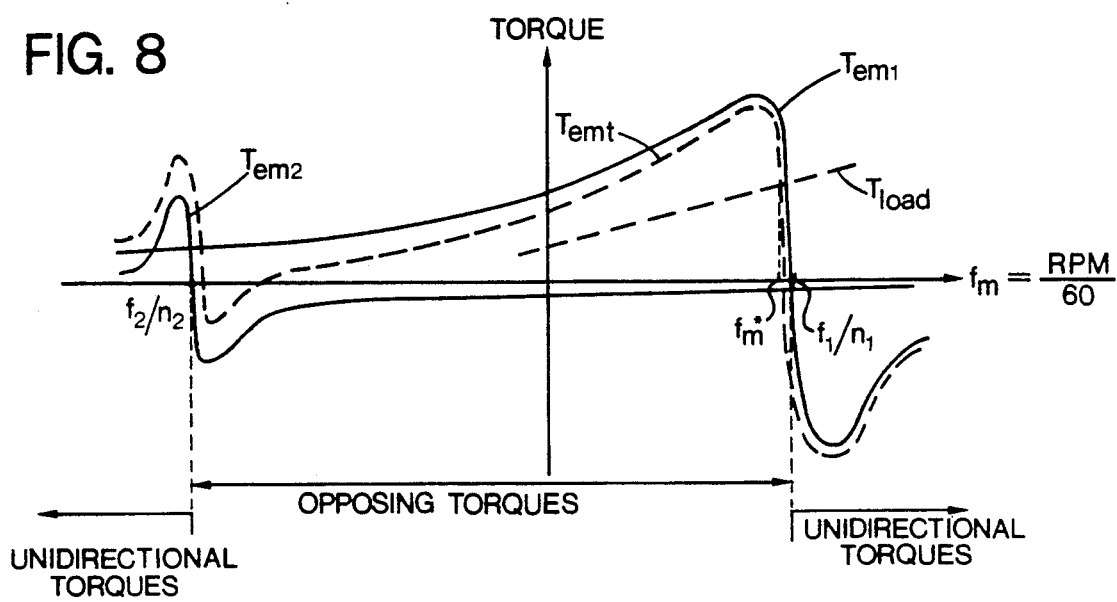
FIG. 8 is a graph of the torque-speed curves of a doubly-fed machine operated in an induction mode.

FIG. 8 illustrates this torque-speed matching for a brushless doubly-fed machine operating in an induction mode and having the equivalent representation of FIG. 4. The total electromagnetic torque $T_{emt}$, of the brushless doubly-fed machine is the sum of the first and second stator system torque components, that is $T_{emt} = T_{em1} + T_{em2}$; where $T_{em1}$ is the 6-pole system torque having a synchronous frequency of $f_{ms1} = f_1/n_1$, and $T_{em2}$ is the 2-pole system torque having a synchronous frequency $f_{ms2} = -f_2/n_2$. Note that the opposite signs of the two synchronous frequency values results from the opposite phase sequence of the supplies to the 6-pole and 2-pole systems.

Referring to the speed-torque curves of FIG. 8, since the 6-pole first stator system is connected to a fixed voltage source, i.e. the power grid 34, the $T_{em1}$--speed curve is fixed. However, by controlling the converter 40 to vary either the amplitude or frequency $f_2$ of the excitation power, the shape of the $T_{em2}$--speed curve may be changed, resulting in a change of shape of the total electromagnetic torque curve $T_{emt}$. The actual shaft speed $f_m^*$ of the machine depends upon the location of a point of intersection between the torque-speed curves of the total electromagnetic torque $T_{emt}$ of the generator and the electrical load torque $T_{load}$ of the grid.

Thus, the shaft speed of the doubly-fed machine operating in an induction mode depends upon the mechanical loading. Therefore, speed control in the induction mode requires a tachometer feedback (not shown) monitor the actual shaft speed. In this type of control scheme, the amplitude and/or frequency of the 2-pole system current may be varied to control the shaft speed to a desired value.

From FIG. 8, it is apparent that in the induction mode the machine has a speed region of opposing torques. In this region, the torque produced by the 6-pole system opposes the torque produced by the 2-pole system. Consequently, the torques in this region do not effectively counteract the load torque. Operation in this region detracts from the machine efficiency because unnecessary heat is accumulated in the rotor conductors.

(b) Doubly-Fed Synchronous Mode of Operation

In the doubly-fed synchronous mode of operation, under steady-state conditions the shaft speed is exclusively controlled by the frequencies supplied to the first and second stator systems 54 and 56, i.e. respectively $f_1$ and $f_2$. Under synchronous operating conditions, a single rotor current frequency prevails in the rotor, thus:

$$f_r = f_{r1} = f_{r2}.$$

This yields, as far as the relationships describing the angular speeds of the rotational fields are concerned, the following equations:

$$f_1 = n_1 f_m + f_r, \text{ and}$$

$$-f_2 = n_2 f_m - f_r.$$

From these equations, the shaft speed in the synchronous mode is:

$$RPM = 60 \times f_m,$$

$$RPM = 60 \times \frac{f_1 - f_2}{n_1 + n_2}.$$

From the above equation, it is apparent that the shaft speed (RPM) is varied by controlling the excitation frequency $f_2$ produced by converter 40. In the synchronous mode of operation, the 6-pole and 2-pole system torques do not oppose one another as in the doubly-fed induction mode of operation. Thus, the machine efficiency is higher in the synchronous mode of operation.

The synchronism of the doubly-fed machine may be lost either by a severe disturbance (mechanical or electrical) or due to inappropriate amplitude values of the 2-pole current produced by converter 40. However, loss of synchronism does not result in a shut down of the machine from oscillatory behavior, but only results in the machine running in the induction mode of operation. The machine maintains stable operation with the shaft speed dependent upon the prime mover characteristics.

Shaft Speed Control

Figure 9:
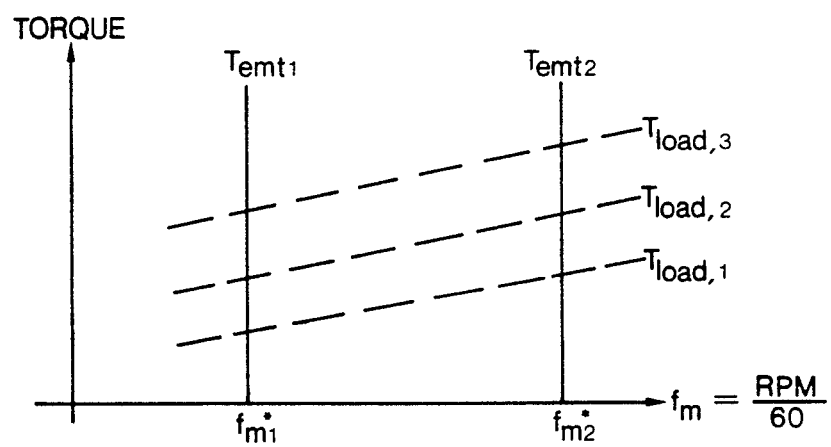
FIG. 9 is a graph of the torque-speed curves of a doubly-fed machine of the present invention operated in a synchronous mode.

Referring to the above equation and FIG. 9 for synchronous doubly-fed operation, it is apparent that the shaft speed may be changed by changing the waveform of the 2-pole current supplied by converter 40. The shaft speed may be continuously reduced under synchronous speed to zero RPM. Over-synchronous operation and reversed speed operation are also possible.

It is also apparent from FIG. 9 that the shaft speed of the brushless doubly-fed machine in the synchronous mode of operation is not sensitive to load variations. Rather the shaft speed is dependent only on the frequency of the 2-pole current supplied by converter 40, provided that synchronous operation is maintained. This is accomplished by satisfying the 2-pole excitation current amplitude requirement, described further below under the heading "Requirements for Operation in the Synchronous Mode."

Synchronization

The synchronous mode of operation may be obtained by synchronization of the machine using one of three methods. That is, synchronization may be achieved at zero RPM, through the induction mode, or by DC synchronization. In either case, before synchronous operation can be initiated, there must be a match in the electrical characteristics at the machine terminals and the source (grid 34 and converter 40) terminals. The electrical characteristics that must match are the amplitude, frequency and phases of the voltages.

(a) Zero Speed Synchronization

Synchronization at zero RPM uses the switch 64 between the 6-pole first stator system 54 and the grid 34. To prepare the machine for synchronization, the rotor 58 is blocked to prevent rotation with switch 64 open. While the rotor is blocked the rms value of the current of the 2-pole second stator system is raised by converter 40. This operation raises the voltage at the terminals of the 6-pole system.

The converter is adjusted until the frequency and rms voltage of the 6-pole first stator system is equal to the frequency and rms voltage of the power grid 34. When the voltage phases are also matched, the switch 64 is closed and the rotor blocking is released. The shaft speed is subsequently increased by the converter 40 by decreasing the frequency of current in the 2-pole second stator system 56.

(b) Synchronization from the Induction Mode

The second method of synchronization is through the induction mode. With the machine running in the induction mode, the converter 40 initially sets the frequency of the 2-pole system current to an arbitrary value. From this arbitrary value, the converter adjusts the amplitude of the 2-pole system current to obtain an RPM value which satisfies the equation: $RPM=(60)[(f_1-f_2)/(n_1+n_2)]$ for synchronous operation. Further fine tuning by converter 40 of the frequency of the 2-pole current may be required to halt rotor slipping, after which the machine pulls into synchronism.

(c) DC Synchronization

The third method is DC synchronization, which is actually a special case of synchronization through the induction mode. Initially, the converter 40 is off and switch 64 is closed, allowing the machine to run at a speed dictated by the grid frequency and the number of pole pairs of the first stator system 54. That is, for a 60 Hertz grid and a 6-pole system, the initial machine speed is 1200 RPM.

To initiate synchronization, the converter 40 injects a DC current, i.e., at a frequency of zero Hertz, into the 2-pole system. The converter gradually increases the DC current amplitude which causes a decrease in the RPM of the machine until the machine locks into the synchronous speed. If the 2-pole DC current is increased beyond this value, the machine remains locked in the synchronous mode of operation.

However, there is an upper limit to the increase of the DC current, beyond which the synchronous mode of operation is lost. If synchronism is lost, system shut down is not required because the machine merely transcends into an induction mode of operation.

Brushless Doubly-Fed Machine Model

Before discussing the theory of operation of the brushless doubly-fed machine, a mathematical model of the machine is developed below. This model assumes only steady-state performance (no transients), balanced machine parameters, and neglects iron losses. For example, the stator windings are assumed to be sinusoidally distributed around the stator periphery. Also, the rotor bars are modelled as lumped inductances and resistances, that is they are slip dependent.

Figure 10:
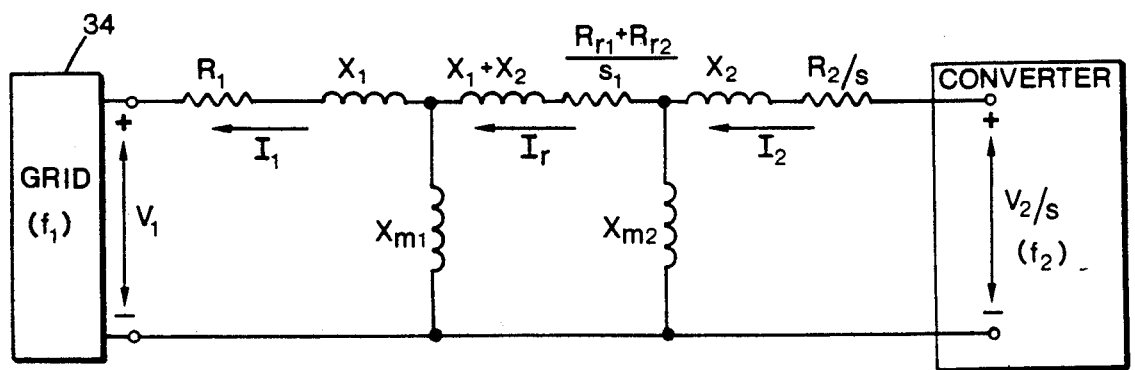
FIG. 10 is a single phase equivalent diagram model of the brushless doubly-fed machine of the present invention.

FIG. 10 is a single-phase equivalent diagram of a circuit model of a brushless doubly-fed machine having the equivalent representation of FIG. 4. In this model, the variables are defined with 6-pole system connected to the grid and 2-pole system to the converter, as:

$V_1$ = phase voltage of 6-pole system
$V_2$ = phase voltage of 2-pole system
$I_1$ = phase current of 6-pole system
$I_2$ = phase current of 2-pole system
$I_r$ = phase current of rotor
$R_1$ = stator resistance of 6-pole system
$X_1$ = leakage reactance of 6-pole system
$R_2$ = stator resistance of 2-pole system
$X_2$ = leakage reactance of 2-pole system
$R_{r1} + R_{r2}$ = total rotor resistance
$R_{m1}$ = 6-pole core loss resistance
$X_{m1}$ = main reactance of 6-pole system
$R_{m2}$ = 2-pole core loss resistance -continued
$X_{m2}$ = main reactance of 2-pole system As mentioned above, the machine core or iron losses are neglected to facilitate analysis of the brushless doubly-fed machine. If included, the resistances $R_{m1}$ and $R_{m2}$ would be in parallel with the respective main reactances $X_{m1}$ and $X_{m2}$.

Since FIG. 10 is a single-phase equivalent diagram, all quantities are per-phase quantities, the voltages are line-to-neutral voltages and the currents are phase currents (conventionally taken as the "a" phase). In this model, the variables are referred to the stator windings of the 6-pole system side of the machine. The model illustrates the effect of the slip $s_1$ on the rotor resistance, and the effect of the total slip s on the stator resistance of the 2-pole system. This effect of the slip stems from the basic electromechanical law of conventional induction machine theory which requires the stator and rotor rotational fields to rotate at the same angular speed.

The interaction of the stator 6-pole system with the rotor, and the interaction of the rotor with the stator 2-pole system, allows the definitions of a 6-pole slip and a 2-pole slip to be, respectively:

6-pole slip $= s_1 = f_{r1}/f_1$, and 2-pole slip $= s_2 = f_{r2}/f_2$,.

with:
$f_{r1}$ = frequency of rotor current induced by the 6-pole system,
$f_{r2}$ = frequency of rotor current induced by the 2-pole system,
$f_1$ = supply frequency of the 6-pole system, and
$f_2$ = supply frequency of the 2-pole system.

Since the above variables are referred to the stator windings of the 6-pole system side of the machine, the slip effect on the 2-pole system is a cascading of the slips $s_1$ and $s_2$. Thus, the 2-pole stator resistance is divided by the total slip. The total slip is defined as:

Total slip $= s = (s_1)(s_2) = (f_2/f_1)(f_{r1}/f_{r2})$.

As mentioned above, although the two rotor frequencies $f_{r1}$ and $f_{r2}$ are not required to be equal, these frequencies become equal in the synchronous doubly-fed mode. Thus:

$f_r = f_{r1} = f_{r2}$, $s_1 = f_r/f_1$, $s_2 = f_2/f_r$, and $s = f_2/f_1$.

Substituting into these equations the angular speed rotational field relationships defined above, these relationships for the doubly-fed synchronous mode become:

$s_1 = f_r/f_1 = [f_1 - (n_1)(f_m)]/f_1$, $s_2 = f_2/f_r = f_2/[f_2 + (n_2)(f_m)]$, and $s = (s_1)(s_2) = f_2/f_1 = [f_1 - (n_1 + n_2)(f_m)]/f_{s1}$, with:
$n_1 = 3$ = number of pole-pairs of 6-pole system,
$n_2 = 1$ = number of pole-pairs of 2-pole system, $f_m$ = shaft-speed in mechanical radians per second,
$f_m$ = RPM/60.

From this, the shaft speed in mechanical radians per second in the synchronous doubly-fed mode is expressed as:

$f_m = (1-s)f_1/(n_1+n_2) = (f_1-f_2)/(n_1+n_2)$, with: Revolutions per minute = RPM = $60 \times f_m$.

A mathematical model based on the equivalent circuit of FIG. 10 has the usual voltage equations around the three meshes of the circuit and the current relations are determined from the two internal nodes of the circuit. From these equations, the power balance between the mechanical input power, the 6-pole power, the 2-pole power, and the two air-gap powers associated with the 2-pole and 6-pole systems is determined. The electromagnetic torques produced by the 2-pole and 6-pole systems are the respective air-gap powers divided by the shaft speed in radians per second.

A Theory of the Synchronous Mode of Operation

A theory of the synchronous mode of operation is developed below using the brushless doubly-fed machine circuit model of FIG. 10. This theory includes mathematical equations for the voltage-current relationships and the power balance. The distribution of the power and torques between the first and second stator systems 54, 56 is understood from the power balance of the brushless doubly-fed machine. After presenting the theory of the performance and characteristics of the brushless doubly-fed machine, a control system for operating the machine will be discussed.

(a) Voltage-Current Relationships

Each of the first and second stator systems 54, 56 induces a voltage on the rotor conductors, and the rotor conductors in turn induce a voltage on each of the first and second stator systems. From the brushless doubly-fed machine circuit model of FIG. 10, these induced voltages are defined as:

Induced voltage on 6-pole stator:

$\overline{E}_{r1} = +jX_{m1}\overline{I}_r$;

Induced voltage due to 6-pole current:

$\overline{E}_1 = -jX_{m1}\overline{I}_1$;

Induced voltage on 2-pole stator:

$\overline{E}_{r2} = -jX_{m2}\overline{I}_r$; and

Induced voltage due to 2-pole current:

$\overline{E}_2 = +jX_{m2}\overline{I}_2$.

Using the above definitions of induced voltage in applying Kirchoff's voltage law to the three meshes or loops of the circuit model in FIG. 10, the voltage-current relationships for the 6-pole stator current, the 2-pole stator current, and the rotor circuit are respectively:

$\overline{V}_1 = -\overline{I}_1 R_1 - j\overline{I}_1(X_1 + X_{m1}) + \overline{E}_{r1}$, $\overline{V}_2/s = +(\overline{I}_2)(R_2/s) + (j\overline{I}_2)(X_2 + X_{m2}) + \overline{E}_{r2}$, and $\overline{E}_1 = -(\overline{I}_r/s_1)(R_{r1}+R_{r2}) - (j\overline{I}_r)(X_1+X_{m1}+X_2+X_{m2}) + \overline{E}_2$.

(b) Power Balance

From the brushless doubly-fed machine equivalent representation shown in FIG. 4, the power flow in the equivalent machine is illustrated in FIG. 11, according to generator convention. That is, the positive direction of power flow corresponds with operation of the brushless doubly-fed machine as a generator.

The symbols used in FIG. 11 are defined as:

$P_{em}$ = electromechanical power, i.e. the net power supplied to the machine's shaft and to be converted into electric power;

$P_{em1}$ = portion of $P_{em}$ converted to electric power by the 6-pole system;

$P_{em2}$ = portion of $P_{em}$ converted to electric power by the 2-pole system;

$P_{ag1}$ = air-gap power, abstract electric power transferred across the air-gap to 6-pole stator windings by the rotor conductors;

$P_{ag2}$ = air-gap power, abstract electric power transferred across the air-gap to rotor conductors by the 2-pole stator windings;

$P_{e1}$ = active power generated by the 6-pole stator windings into grid; and $P_{e2}$ = active power supplied to the 2-pole stator windings by converter.

The power balance of the brushless doubly-fed machine involving the above quantities of power is obtained from the voltage-current relationships above. By multiplying the voltage equation for the 6-pole system by the conjugated 6-pole current $\bar{I}_1^*$ yields the following:

$$\bar{V}_1 \bar{I}_1^* = -I_1^2 R_1 - jI_1^2(X_1 + X_{m1}) + \bar{E}_{r1}\bar{I}_1^*.$$

To convert the above single-phase equivalent equation into a 3-phase representation, all the terms to the right and left of the equal sign are multiplied by three. By taking the real part ($R_e$) of the result, a power relationship for the 6-pole stator circuit is found according to:

$$P_{e1} = -3I_1^2 R_1 + P_{ag1},$$

with:

$P_{e1} = 3R_e\{\bar{V}_1\bar{I}_1^*\} = 3V_1 I_1 \cos(\phi_1)$, $3I_1^2 R_1$ = power dissipated by 6-pole stator, $P_{ag1} = 3R_e\{\bar{E}_{r1}\bar{I}_1^*\}$.

The same strategy is applied to obtain the power relationships for the 2-pole stator system and the rotor circuit. Thus, the power relationship for the 2-pole stator circuit is:

$$P_{e2} = +3I_2^2 R_2 + s_2 P_{ag2},$$

with:

$P_{e2} = 3R_e\{\bar{V}_w\bar{I}_2^*\} = 3V_2 I_2 \cos(\phi_2)$, $3I_2^2 R_2$ = power dissipated by 2-pole stator, $P_{ag2} = 3(s_1)R_e\{\bar{E}_{r2}\bar{I}_1^*\}$.

Power relationship associated with the rotor circuit:

$$s_1 P_{ag2} = P_{ag2} - 3I_r^2 R_{r1} - 3I_r^2 R_{r2},$$

with:

$P_{ag1}$ and $P_{ag2}$ defined above, and $3I_r^2(R_{r1} + R_{r2})$ = power dissipated by the rotor winding conductors.

The above power relationships for the 2-pole and 6-pole stator circuits and for the rotor circuit relate different portions of the electrical power with the two air-gap powers $P_{ag1}$ and $P_{ag2}$. The electromechanical power may also be related to these air-gap powers. The total electromechanical power $P_{em}$ for generator convention operation of the doubly-fed machine, may be considered as supplying a portion to the 6-pole system and another portion to the 2-pole system. Thus, $$P_{em} = P_{em1} + P_{em2}.$$

Since the air-gap power and the electromechanical power of the 6-pole system are both related to the electromagnetic torque $T_{em1}$ produced by the 6-pole system, the following relationships exist:

$$P_{ag1} = (T_{em1})(2\pi f_1)/n_1, \text{ and}$$

$$P_{em1} = (T_{em1})(2\pi f_m).$$

From the above equations and the equation for the 6-pole slip $s_1$, it follows that:

$$f_m = (1 - s_1)(f_1/n_1).$$

By substituting this relationship for $f_m$ into the above equation for $P_{em1}$ and by equating $T_{em1}$ and the above equations, the following results:

$$P_{em1} = (1 - s_1)(P_{ag1}).$$

Using the same strategy for the 2-pole system with the torque produced by the 2-pole system $T_{em2}$, the following results are obtained:

$$P_{ag2} = (T_{em2})(2\pi f_r)/n_2,$$

$$P_{em2} = (T_{em2})(2\pi f_m),$$

$$f_m = (1 - s_2)(f_r/n_2), \text{ and}$$

$$P_{em2} = (1 - s_2)P_{ag2}.$$

These power balance relationships are illustrated in FIG. 12 for the brushless doubly-fed machine, according to generator convention. If the dissipation or heat losses ($I^2R$ losses) are minimized in the machine design to the point where they may be discarded, then a number of important conclusions may be drawn from the derived power balance relations.

(1) Torque Distributions

From the above equations, the distribution of the torques due to the 2-pole system and the 6-pole system may be established. The ratio of the two torques is:

$$P_{em2}/P_{em1} = T_{em2}/T_{em1}$$

$$P_{em2}/P_{em1} = [(1 - s_2)(P_{ag2})]/[(1 - s_1)(P_{ag1})].$$

If the heat losses ($I^2R$ losses) are neglected, then from the power balance relationships of FIG. 12 it follows that: $P_{ag2} = s_1 P_{ag1}$. Using this relationship, the air-gap power may be eliminated from the above equation. Therefore:

$$P_{em2}/P_{em1} = T_{em2}/T_{em1}$$
$$= [(1 - s_2)(s_1)]/(1 - s_1).$$

By substitution for $(1-s_1)$ and $(1-s_2)$, and using the definition for the 6-pole slip $s_1$, the torque distribution is:

$$P_{em2}/P_{em1} = T_{em2}/T_{em1} = n_2/n_1.$$

With $n_1=3$ and $n_2=1$ representing the pole-pairs of, respectively, the 6-pole system and the 2-pole system, it is apparent that the power converted by the 6-pole system is three times as high as that converted by the 2-pole system. Thus, the 6-pole first stator system 54 is connected to the grid 34 to handle the bulk of the brushless doubly-fed machine power.

(2) Excitation Requirements

The active excitation power required by the brushless doubly-fed machine $P_{e2}$ is supplied to the 2-pole second stator system 56 of the machine. This active excitation power can be found from the power balance relations of FIG. 12. Disregarding the $I^2R$ losses, it follows that:

$$P_{e2} = s_2 P_{ag2} = s_2 s_1 P_{ag1} 32 \, s P_{ag1} = s P_{e1}.$$

Moreover, since:

$$\begin{aligned}
P_{em} &= P_{em1} + P_{em2} \\
&= (1-s_1)P_{ag1} + (1-s_2)P_{ag2} \\
&= P_{ag1} - s_1 P_{ag1} + P_{ag2} - s_2 P_{ag2} \\
&= P_{ag1} - s_2 P_{ag2} \text{ (since } s_1 P_{ag1} = P_{ag2}) \\
P_{em} &= P_{e1} - P_{e2}.
\end{aligned}$$

By combining the above two groups of equations, the excitation power provided by converter 40 is determined as:

$$P_{e2} = s P_{e1} = [s/(1-s)](P_{em}),$$

with the slip s defined as:

$$s = f_2/f_1 = [f_1 - (n_1+n_2)(f_m)]/f_1, \text{ and}$$

$$f_m = RPM/60.$$

From this, the required rating of the converter 40 may be determined. It is desirable to limit the converter rating while maintaining a speed range from zero RPM up to 20% beyond the synchronous speed. Such a converter maintains a high input power factor when the converter load power factor deteriorates (i.e., the second stator system 56). The power factor of the second stator system as seen from the converter 40, decreases with an increase in a shaft speed above synchronous speed.

(c) Circle Diagram

A circle diagram is an analytic tool used to design a control strategy for the brushless doubly-fed machine operated in a synchronous mode. Basically, a circle diagram graphically reflects the steady-state operating conditions of the brushless doubly-fed machine. At any particular operating point on the circle diagram, the operating characteristics of the machine are known: the active and reactive power passing between the machine 50 and the grid 34, the rms value and phase angle of both the stator and rotor phase currents, the power factor, the electromagnetic torque produced, or the air-gap power and the torque angle. From the circle diagram, the stability of the various operating points may also be predicted, as well as a desirable region of operation.

Prior to constructing a circle diagram, the brushless doubly-fed machine's single-phase circuit model of FIG. 10 is simplified using Thevenin's theorem. A Thevenin equivalent of a 6-pole system is obtained by eliminating the branch containing $X_{m1}$ (the main inductance due to the magnetic coupling between the 6-pole system and the rotor). The resulting circuit is shown in FIG. 13. The system variables relating to the 2-pole second stator system 56 are the same, to illustrate the control exercised by the converter 40 over the brushless doubly-fed machine. The Thevenin resistance, reactance and equivalent 6-pole voltage are respectively $R_1^{Th}$, $X_1^{Th}$ and $\overline{V}_{e1}$, are defined as:

$$R_1^{Th} = (R_1 X_{m1}^2)/[R_1^2 + (X_{m1}+X_1)^2],$$

$$X_1^{Th} = [X_{m1}(R_1^2 + X_1^2 + X_{m1}X_1)]/[R_1^2 + (X_{m1}+X_1)^2],$$

$$\overline{V}_{e1} = c^{Th} \overline{V}_1,$$

with:

$$c^{Th} = (jX_{m1})/[R_1 + j(X_{m1}+X_1)].$$

The phase and amplitude of the equivalent 6-pole voltage $\overline{V}_{e1}$ are not equal to the phase and amplitude of the original 6-pole voltage $\overline{V}_1$. However, by inspecting the last of the above equations and realizing that $R_1 << (X_{m1}+X_1)$, it is apparent that the phase shift is negligible. By neglecting the phase shift, it follows that:

$$c^{Th} = (X_{m1})/(X_{m1}+X_1).$$

Moreover, since by design the leakage reactance $X_1$ is much, much less than the main inductance $X_{m1}$, it apparent that $\overline{V}_{e1}$ and $\overline{V}_1$ are practically equal.

The Thevenin equivalence should also preserve the power balance relationships of the brushless doubly-fed machine. Therefore, the equivalent 6-pole current $\overline{I}_{e1}$ is related to the actual 6-pole current according to:

$$\overline{I}_{e1} = \overline{I}_r = \overline{I}_1/c^{Th}.$$

Figure 14:
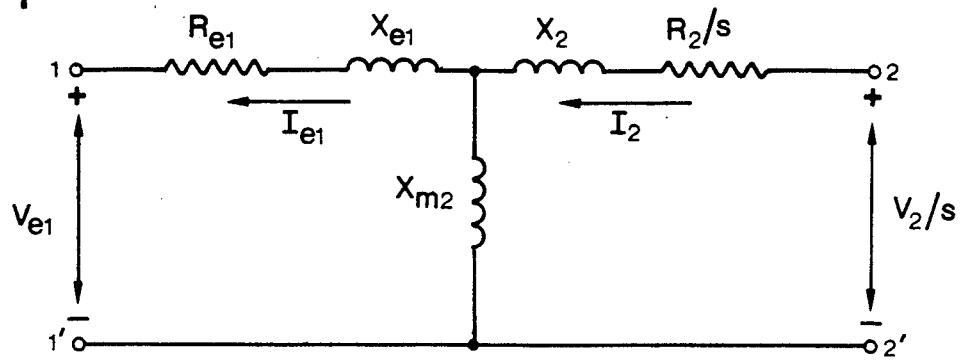
FIG. 14 is a single phase equivalent diagram of a simplified Thevenin equivalent model of the brushless doubly-fed machine of FIG. 10.

From the equations above, the circuit of FIG. 13 may be simplified as shown in FIG. 14, where the equivalent 6-pole resistance $R_{e1}$ and equivalent 6-pole leakage reactance $X_{e1}$ are given by:

$$R_{e1} = R_1^{TH} + [(R_{r1}+R_{r2})/(s_1)], \text{ and}$$

$$X_{e1} = X_1^{Th} + X_{r1} + X_{r2}.$$

The voltage-current relationships of the 6-pole first and 2-pole second stator circuits and the rotor circuit are:

$$\overline{V}_{e1} = -\overline{I}_{e1} R_{e1} - j\overline{I}_{e1}(X_{e1}+X_{m2}) + \overline{E}_2,$$

$$\overline{V}_2/s = +\overline{I}_2(R_2/s) + j\overline{I}_2(X_2+X_{m2}) + \overline{E}_{r2},$$

with $\overline{E}_2$ and $\overline{E}_{r2}$ defined as:

$$\overline{E}_2 = +jX_{m2}\overline{I}_2, \text{ and } \overline{E}_{r2} = -jX_{m2}\overline{I}_r = -jX_{m2}\overline{I}_{e1}.$$

Having constructed a simplified model of a brushless doubly-fed machine, the circle diagram will be described in greater detail, referring to FIGS. 15, 16 and 17. Each point of the circle diagram represents a steady-state operating condition. Trajectories of these operating points are circles if certain variables are held constant. These circles are:
(a) circles of constant 6-pole current,
(b) circles of constant 2-pole current, and
(c) circles of constant air-gap power or electromagnetic torque.

Each of these circles will be discussed below before discussing the practical significance of these circle diagrams.

(1) Circles of Constant 6-Pole Current For the First Stator System (54)

Figure 15:
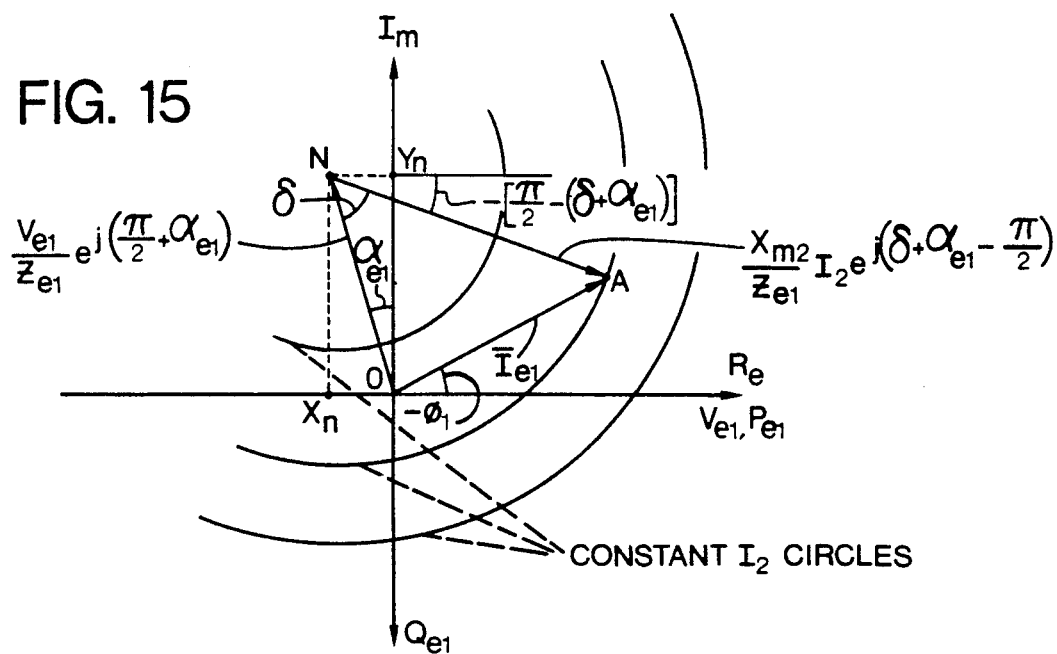
FIGS. 15, 16, 17 and 18 are circle diagrams illustrating various operating modes of the brushless doubly-fed machine of the present invention.

Referring to FIG. 15, the Thevenin equivalent i voltage at the terminals of the 6-pole first stator system $\overline{V}_{e1}$ (see FIG. 14) is located on the horizontal axis, extending to the right of the origin. Thus, this voltage phasor has a phase angle of zero. The 6-pole equivalent current phasor $\overline{I}_{e1}$ extends from the origin to an operating point A. Given the location of an operating point, the power factor, active power and reactive power for the operating point are found from the circle diagram.

The power factor angle $\phi$ is the negative value of the angle between the 6-pole current phasor $\overline{I}_{e1}$ and the 6-pole voltage phasor $\overline{V}_{e1}$. From the circle diagram, the active power $P_{e1}$ and the reactive power $Q_{e1}$ at the 6-pole terminals are:

$$P_{e1} = V_{e1}I_{e1}\cos(\phi) \text{ and } Q_{e1} = V_{e1}I_{e1}\sin(\phi).$$

(2) Circle of Constant 2-Pole Current of the Second Stator System (56)

From the equation above which defined the Thevenin equivalent voltage $\overline{V}_{e1}$, the Thevenin equivalent 6-pole current $\overline{I}_{e1}$ is derived as:

$$\overline{I}_{e1} = (V_{e1}/Z_{e1})\exp[j(\alpha_{e1}+\pi/2)] + (X_{m2}/Z_{e1})\overline{I}_2\exp[-j(\alpha_{e1}+\delta-\pi/2)]$$

with:
phase angle of $\overline{V}_{e1}$ equal to zero,
$\delta$ = phase angle of $\overline{E}_2$, with $\overline{E}_2 = jX_{m2}\overline{I}_2$,
$Z_{e1} = [R_{e1}^2 + (X_{e1}+X_{m2})^2]^{\frac{1}{2}}$, and $$\alpha_{e1} = \arctan[(X_{e1}+X_{m2})/R_{e1}].$$

The variables $Z_{e1}$ and $\alpha_{e1}$ are respectively the magnitude and angle of the synchronous impedance of the equivalent 6-pole system. The balance of the terms are defined above with reference to FIG. 14. The terms defining the phasor $\overline{I}_{e1}$ are plotted on the circle diagram of FIG. 15. The 2-pole current phasor $\overline{I}_2$ is multiplied by a constant equal to $X_{m2}/Z_{e1}$, and is the arrow extending from a point n to the operating point A. Thus, a trajectory of operating points with a constant rms value of the 2-pole current $\overline{I}_2$ is a circle having a center at point N. The ordinates of point N are found from the equation for $\overline{I}_{e1}$ as:

$$x_n = (V_{e1}/Z_{e1})\sin(\alpha_{e1}), \text{ and}$$

$$y_N = (V_{e1}/Z_{e1})\cos(\alpha_{e1}).$$

Thus, concentric circles representing a constant rms value of the 2-pole second stator system current $\overline{I}_2$ are shown in FIG. 15 as having a common center at point N.

(3) Circles of Constant Air-Gap Power or Electromagnetic Torque

The brushless doubly-fed machine air-gap power $P_{ag}$ is related to the electromagnetic torque $T_{em}$ by a constant and is defined by:

$$P_{ag} = T_{em}[2\pi f_1/(n_1+n_2)],$$

with:
$f_1$ = supply frequency of the 6-pole system,
$n_1 = 3$ pole pairs for the 6-pole system, and
$n_2 = 1$ pole pairs for the 2-pole system.

The electromagnetic torque $T_{em}$ is the total electromagnetic torque produced by the brushless doubly-fed machine. A relationship between the air-gap power $P_{ag}$ and the electromechanical power $P_{em}$ is derived as:

$$P_{em} = (T_{em})(2\pi f_m) = (T_{em})(2\pi)[(1-s)f_1/(n_1+n_2)]$$

$$P_{em} = (1-s)P_{ag}.$$

From the resource and prime mover characteristics, the value of $P_{em}$ is known. At a given RPM or speed, the slip s is known, and thus, from these known values the air-gap power $P_{ag}$ is found from the above equation. This air-gap power is for the Thevenin equivalent model of the brushless doubly-fed machine shown in FIG. 14.

To determine the constant air-gap power circles of operating points which also represent a constant electromagnetic torque, the power balance of the brushless doubly-fed machine of FIG. 14 is analyzed. From the definition of the Thevenin equivalent voltage at the terminals of the 6-pole system, $\overline{V}_{e1}$, the active power balance is found by multiplying each side of the equation with $3\overline{I}_{e1}^*$ (three times the conjugate of the Thevenin equivalent current through the 6-pole stator system) and subsequently taking the real part of the resulting equation. Thus:

$$3 \text{ Real } \{\overline{V}_{e1}\overline{I}_{e1}^*\} = -3R_{e1}I_{e1}^2 + P_{ag},$$

with:
$$P_{ag} = 3 \text{ Real } \{jX_{m2}\overline{I}_2\overline{I}_{e1}^*\}.$$

Since the power factor angle $\phi$ is the angle between the voltage phasor $\overline{V}_{e1}$ and the current phasor $\overline{I}_{e1}$, it follows that:

$$3V_{e1}I_{e1}\cos(\phi) = -3R_{e1}^2I_{e1}^2 + P_{ag}.$$

Since the phasor $\overline{V}_{e1}$ is located on the horizontal axis of the circle diagram, the power factor angle $\phi$ is the angle between the equivalent 6-pole current phasor $\overline{I}_{e1}$ and the horizontal axis. Therefore, the horizontal axis of the circle diagram is a measure of $I_{e1}\cos(\phi)$. The vertical axis in the positive direction (downward) is a measure of $I_{e1}\sin(\phi)$. Consequently the following relation holds:

$$I_{e1}^2 = [I_{e1}\cos(\phi)]^2 + [I_{e1}\sin(\phi)]^2.$$

Substituting this equation into the one above, and dividing by $3R_{e1}$ yields:

$$(V_{e1}/R_{e1})[I_{e1}\cos(\phi)] = -[I_{e1}\cos(\phi)]^2 - [I_{e1}\sin(\phi)]^2 + (P_{ag}/3R_{e1}).$$

Rearranging terms in this result leads to the equation of a circle according to:

$$\{[I_{e1}\cos(\phi)] + (V_{e1}/2R_{e1})\}^2 + [I_{e1}\sin(\phi)]^2 = [(V_{e1}/2R_{e1})^2 + (P_{ag}/3R_{e1})]^{\frac{1}{2}}.$$

The ordinates of the center M of this circle are:

$$x_M = -(V_{e1}/2R_{e1}) \text{ and } y_M = 0.$$

Figure 16:
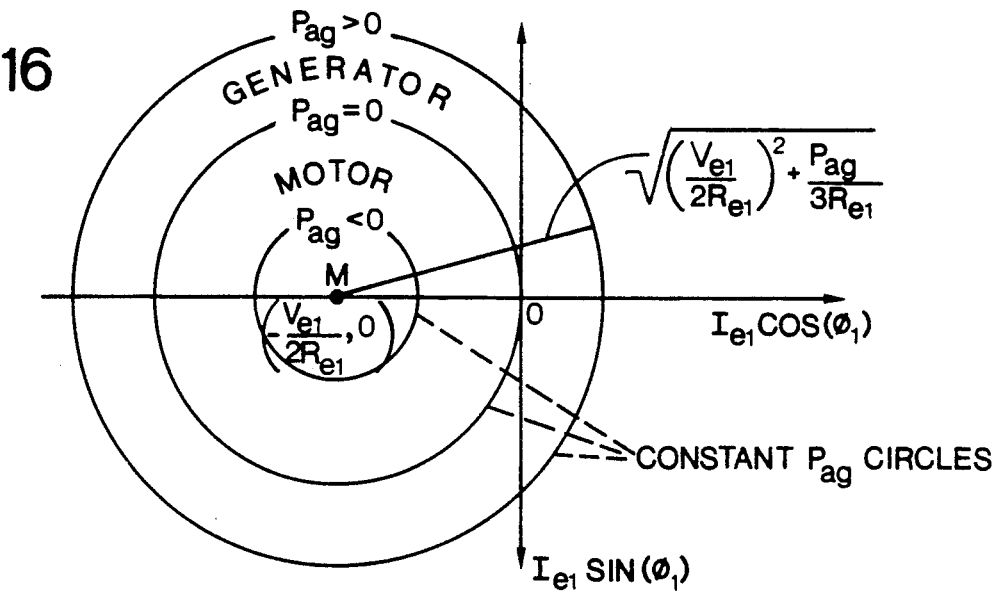
Figure 17:
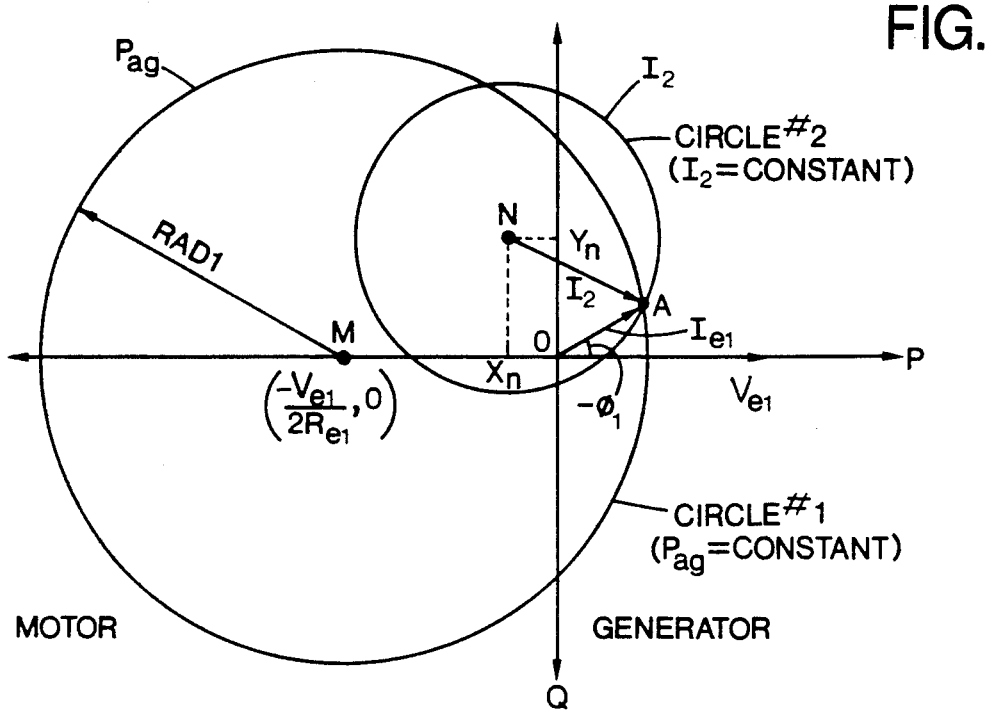

FIG. 16 illustrates concentric circles having different constant values of the air-gap power $P_{ag}$. The circle representing zero air-gap power passes through the origin. Generator operation of the brushless doubly-fed machine corresponds to air-gap powers which are greater than zero, while motor operation corresponds to air-gap powers which are less than zero, as shown in FIG. 16.

(4) Significance of the Circle Diagram

Any point on the circle diagram represents an operating condition. The location of the operating point on the circle diagram reflects the status of all important variables of the brushless doubly-fed machine. FIG. 17 shows such an operating point at point A. The operating point A is at the intersection of the circles for the constant 6-pole current, the constant 2-pole current, and the constant air-gap power or electromagnetic torque. Also, the power factor and the active and reactive power at the 6-pole terminals of the brushless doubly-fed machine are known.

In addition to reflecting the status of the machine, an operating point on the circle diagram also indicates the requirements to obtain this operating condition. For example, consider initial operation at point A in FIG. 17. This condition corresponds with a certain amount of air-gap power $P_{ag}$ associated with circle #1 (point M is center of this circle) and a certain rms value of the 2-pole current $I_2$ associated with circle #2 (point N as center). Assuming that no change occurs to the prime mover output power nor the RPM of the machine, $I_2$ is reduced by means of the converter.

The circle diagram predicts the effect of this change in the operating conditions. No change in prime mover output power and RPM conditions causes the air-gap power to be constant. The reduction of the 2-pole current $I_2$ changes the operating condition from point A to another point determined by the intersection of circle #1 and a constant-$I_2$ circle with a reduced radius. The trajectory of the operating points follows circle #1 until no intersection occurs between circle #1 and a constant-$I_2$ circle. This obviously occurs when the rms value of the 2-pole current $I_2$ is reduced to below a certain value. This value is the radius of a constant-$I_2$ circle which is tangent to circle #1.

(d) Requirements for Operation in the Synchronous Mode

Synchronous operation of the brushless doubly-fed machine under changing prime mover or load conditions (power and shaft speed) is maintained by controlling the excitation current $I_2$ with the converter 40. In predicting the trajectory of the operating conditions (points) on the circle diagram, the effects of these changes and controls on the centers M and N of the constant $P_{ag}$ circles and the constant $I_2$ circles are defined. The formulas defining the ordinates of centers M and N (see above) depend upon three quantities: $V_{e1}$, $Z_{e1}$ and $R_{e1}$, that is the Thevenin equivalent values for the 6-pole first stator system of voltage, synchronous impedance and resistance.

Since the terminals of the 6-pole system are connected directly to the power grid 34, the voltage $V_{e1}$ is assumed to be constant. However, $R_{e1}$ and $Z_{e1}$ are dependent upon the 6-pole slip $s_1$, which in turn depends upon the shaft speed according to the equation:

$$RPM = (60)(f_m) = (60)(1-s_1)(f_1/n_1).$$

Thus, it is apparent that the locations of centers M and N for the constant $P_{ag}$ circles and for the $I_2$ circles depend upon the shaft speed. It appears that synchronous operation with shaft speeds at, below or beyond the synchronous speed (i.e. slip equal to or greater than zero) is quite feasible.

Figure 18:
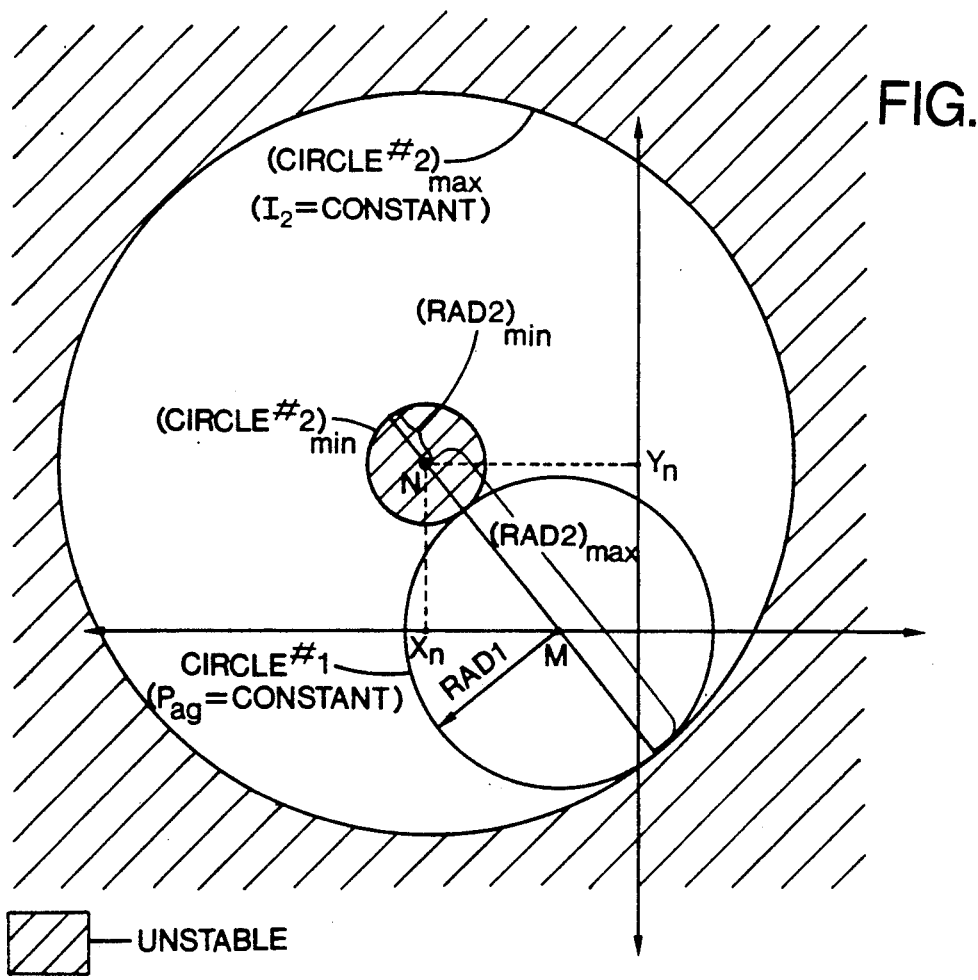

The apparent requirements for synchronous operation of the brushless doubly-fed machine are explained with reference to the circle diagram of FIG. 18. Assuming that the brushless doubly-fed machine converts a certain amount of mechanical input power $P_{em}$ at a certain shaft speed corresponding to a certain slip value s, the air-gap power is determined from the equation: $P_{ag} = P_{em}/(1-s)$. FIG. 18 illustrates this air-gap power circle as having a center M and a radius Rad1. The slip-dependent location of point N, the center of the constant $I_2$ circles (circle #2) is also illustrated in FIG. 18.

Synchronous operation occurs when the converter 40 supplies an rms value of the 2-pole current $I_2$ such that the corresponding constant $I_2$ circle intersects with the constant $P_{ag}$ circle (circle #1). From this, it may be concluded that synchronous operation in the shaded area of FIG. 18 is not possible, i.e. if $I_2$ is beyond the limits of $(Rad2)_{min}$ and $(Rad2)_{max}$. These minimum and maximum limits are found from the radius values of the respective inner and outer constant $I_2$ circles which are tangent to the $P_{ag}$ circle.

Such an analysis may easily be performed by computer analysis by inputting the mechanical power-speed characteristics for the prime mover. Such characteristics may be ramp-like in nature, or cubic, such as the cubic power-speed characteristics exhibited by wind turbines and hydro turbines if operated at maximum efficiency. For the mechanical input power and shaft-speed condition for a given prime mover, the location of the centers M and N may be determined by the equations above. From this, minimum and maximum values of the required 2-pole current may be determined.

(e) Control for the Synchronous Mode of Operation

From the above, it is believed that synchronous operation of the brushless doubly-fed machine may be assured if the rms value of the 2-pole second stator system current $I_2$ is controlled so that the reactive power Q at the 6-pole first stator system terminals is equal to zero under all circumstances. $I_2$ implementing this control strategy, it is also believed that the minimum and maximum values for $I_2$ are never exceeded.

The synchronous mode may further be studied by substituting into the above equations various values of the mechanical input power of the generator and varying values of slip. For example, under no load conditions where any losses are merely caused by the mechanical structure and bearings of the machine, a decreasing slip value causes the radius of the constant air gap power $P_{ag}$ circles to decrease, as well as causing the circle centers M to move closer to the origin. However, the location of the center N for the constant $I_2$ circles does not significantly change for changing values of slip. Thus, it is apparent that synchronous operation requires the 2-pole current $I_2$ to be adjusted by the converter 40 within minimum and maximum values which decrease with decreasing slip values.

By substituting full load characteristics for the mechanical input power to the generator 50 and varying values of slip into the above equations, synchronous operation characteristics for the machine are similar to those for the no load condition. However, the full load rate of decrease of the maximum and minimum values of $I_2$ with decreasing values of slip is not as high as the rate of decrease for the no load characteristics. Under full load conditions, the radius of the constant $P_{ag}$ circles does not decrease considerably as the slip is decreased.

Thus, for synchronous operation the converter 40 controls the rms value of the 2-pole second stator system current within a certain range which is dependent upon the shaft speed. For example, for operation as a generator, the 2-pole current range is also dependent upon the resource conditions if maximum efficiency variable speed generation is desired. A convenient control strategy is to control the reactive power is by means of a reactive power controller. An analysis of the circle diagrams s outlined above, indicates that synchronous operation may be obtained if the rms value of the 2-pole current $I_2$ is controlled so that the reactive power Q at the 6-pole terminals of the machine is equal to zero under all circumstances. Since synchronous operation may be assured if a constant $I_2$ circle intersects with a constant $P_{ag}$ circle, holding Q equal to zero provides such an intersection.

The above derivations, calculations and conclusions have been for operation of the brushless doubly-fed machine under steady-state conditions. Transient conditions may occur when changing from one operating state to another, that is during changes in the frequency and/or amplitude of the excitation power supplied by converter 40. It is apparent that slowing these changes in the excitation power will decrease the occurrence of transient phenomena. Transient conditions may also occur during electrical load changes of the grid 34. The natural damping of the system will eliminate some of these transients. Additionally, the transients may be avoided by maintaining operation within the stable steady-state transient limits of the particular machine. Thus, transient control of the present invention is provided by slowing the changes from one operating state to another.

While the above derivations, equations and conclusions have been in terms of the second stator system current for a converter 40 operated in a controllable current source mode, it is apparent that analogous derivations, equations and conclusions may be drawn in terms of the second stator system voltage for the converter 40' operating in a controllable voltage source mode.

Referring to FIGS. 1 and 2, the present invention provides a method of converting resource energy from the resource 32 into electrical power, and a method of controlling a variable speed generation system 30 which accomplishes this irrespective of variations in the resource energy. To implement this, the energy conversion generation systems 28, 28' each include controller means, such as respective VSG controllers 80, 80', for controlling the respective converters 40, 40'. The conversion systems 28, 28' also include sensor means for sensing or monitoring an output parameter of the electrical power output supplied to grid 34 and for producing an output parameter sensor signal corresponding to the sensed or monitored output parameter.

In the illustrated embodiments of FIGS. 1 and 2, the sensor means includes reactive power sensor means, such as a reactive power sensor 82, for sensing the reactive power component $Q_{eo}$ of the electrical power output and for producing a reactive power sensor signal. As shown in FIG. 1, the sensor means may also include real power sensor means, such as real power sensor 84, for sensing the real component of the electrical power output $P_{eo}$ and for producing a real power sensor signal corresponding to the sensed real component. The sensors 82 and 84 are commercially available and include conventional circuitry and transducers, such as Hall effect-type current transducers and voltmeters, to monitor the voltage and current outputs and to determine therefrom the respective reactive and real components of the electrical power output supplied to grid 34.

The VSG controllers 80, 80' include converter controller means, such as respective converter controllers 86 and 86'. The converter controllers 86, 86' each include reference means for establishing a reference signal, such as reactive power reference means 88, for establishing a reactive power reference signal $Q_{eo,REF}$ corresponding to a desired reactive power component of the electrical power output to grid 34. The reference means also includes speed reference means, such as a reference speed adjuster 90, for establishing a reference speed signal $f_2'$ which corresponds to a desired generator speed. This reference speed signal comprises a frequency component signal $f_2$.

The converter controllers 86 and 86' each include stabilizer means, such as respective stabilizers 92 and 92', for stabilizing the VSG systems 30, 30' and thereby stabilizing the energy conversion generation systems 28, 28', respectively. The inputs to each stabilizer 92, 92' are the reactive power sensor signal and reactive power reference signal. To receive these inputs, each stabilizer 92, 92' includes comparator means, such as a reactive power comparator 94, for comparing the reactive power sensor signal with the reactive power reference signal. The comparator 94 compares these signals and produces therefrom a differential reactive power output signal which is representative of the difference between the reactive power sensor signal and the reactive power reference signal. In the illustrated embodiment, this reference signal has a positive (+) value, and this sensor signal has a negative (−) value.

Each stabilizer 92, 92' includes delay means, such as respective delay networks 96 and 96', for delaying the differential reactive power output signal received from reactive power comparator 94 and for producing therefrom an amplitude component signal. For the converter 40 of FIG. 1 operating in a controllable current source mode, the amplitude component signal comprises a current amplitude signal $i_2$. For the converter 40' of FIG. 2 operating in a controllable voltage source mode, the amplitude component signal comprises a voltage amplitude signal $v_2$.

Figure 19:
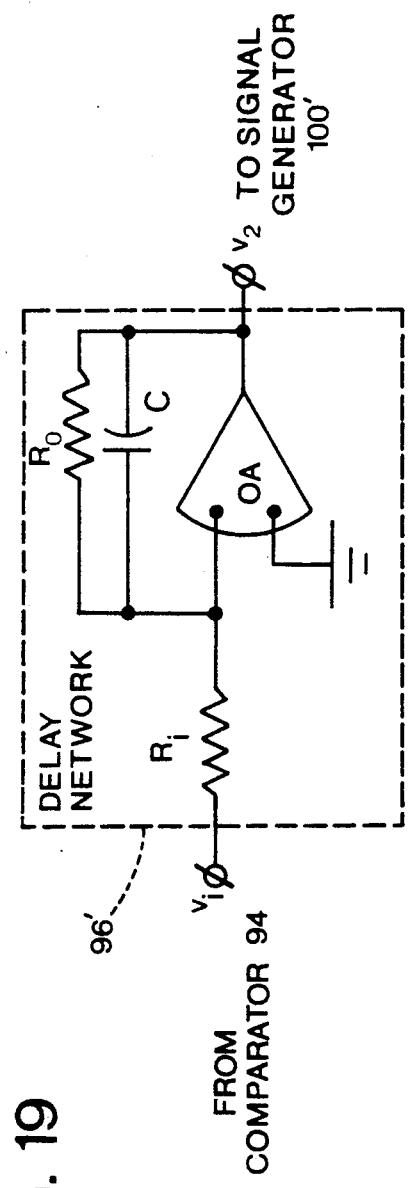
FIG. 19 is a schematic diagram of one form of a delay network of the present invention.

To illustrate the operation of the delay means, the delay network 96' is shown in FIG. 19. The differential reactive power output signal received by the delay network 96' is illustrated as a voltage input signal $v_i$. The delay network 96' includes resistors $R_i$ and $R_o$, a capacitor C, and an operational amplifier OA. The output voltage of the delay network is the voltage amplitude signal $v_2$. The delay network 96' maintains the ratio of the output voltage $v_2$ to input voltage $v_i$ as:

$$v_2/v_i = R_o/[R(1+ts_o)]$$

with:
$s_o$ denoting the Laplace transform; and
t denoting a time constant.

It is apparent that a similar ratio may be established in terms of current signals for the delay network 96 of FIG. 1. It is also apparent from FIGS. 1 and 2 the respective current and voltage amplitude signal outputs of the delay networks 96 and 96' comprise the respective current and voltage amplitude component signal outputs $i_2$ and $v_2$ of stabilizers 92 and 92'.

The converter controllers 86, 86' include signal generator means, such as respective signal generators 100 and 100', for generating the controller signal which controls the respective converters 40, 40'. Each signal generator 100, 100' receives the respective current and voltage amplitude component signals $i_2$ and $v_2$ from stabilizers 92 and 92', and the frequency component signal $f_2$. Referring to FIG. 2, the signal generator 100' receives the frequency component signal $f_2$ directly from the reference speed adjuster 90.

Referring to FIG. 1, the converter controller 86 includes optional turbine efficiency maximizer means, such as a turbine efficiency maximizer 102, for maximizing the efficiency of the prime mover 36 and for producing a turbine efficiency output signal $f_2''$. The converter controller 86 further includes switching means, such as switch 104, for receiving and selecting either the turbine efficiency output signal $f_2''$ from the turbine efficiency maximizer 102 or the reference speed signal $f_2'$ from the reference speed adjuster 90. The selected signal then serves as the frequency component signal $f_2$ which is supplied to the signal generator 100.

For the illustrated embodiment of a 3-phase generator 50, the signal generators 100, 100' generate a 3-phase controller signal. This 3-phase controller signal is generated by providing 120° positive and negative phase shifts to the controller frequency and amplitude signals. Thus, the controller signal has amplitude and frequency components which correspond to the respective received amplitude and frequency component signals.

Referring to FIG. 2, for converter 40' operating in a controllable voltage source mode, the signal generator 100' produces a controller signal comprising a 3-phase voltage signal $v_{2a}^*$, $v_{2b}^*$ and $v_{2c}^*$. The signal generator 100 of FIG. 1 is similar in operation to that of FIG. 2, except the signal generator 100 produces a 3-phase controller signal comprising current signals $i_{2a}^*$, $i_{2b}^*$ and $i_{2c}^*$. An example of a suitable signal generator 100, 100' is commercially available from Tektronix, Inc., Tektronix Industrial Park, Beaverton, Oreg. 97077, under the name of TM500 Series Signal Generator.

Prior to discussing the operation of the turbine efficiency maximizer 102, the generation of the input signals required by the turbine efficiency maximizer will be discussed.

The energy conversion generation system 28, having a turbine efficiency maximizer 102, includes prime mover input sensor means for sensing an input parameter of resource 32 to the prime mover 36, and for producing a prime mover input sensor signal corresponding to the sensed input parameter. In the hydro example of FIG. 1, the prime mover input sensor means comprises head sensor means, such as head sensor 106, which monitors the pressure head of the hydro received by the turbine and produces a prime mover input sensor signal comprising a head sensor signal H. Similarly, for a wind turbine prime mover where the resource is wind having a wind speed, the prime mover input sensor means comprises wind speed sensor means (not shown) for sensing the wind speed and producing a wind speed sensor signal. Such prime mover input sensors are commercially available, and selection of a particular model or type depends upon the particular application. The prime mover input sensor signal, illustrated in FIG. 1 as the head sensor signal H is one of the inputs required by the turbine efficiency maximizer 102.

The VSG controller 80 also includes power demand reference means 108 for establishing a real power demand signal $P_{eo,REF}$, corresponding to a real power demand $P_{DEMAND}$ of the grid 34. The real power reference means 108, as well as the reactive power reference means 88, may be set by automated means or manually, according to a desired power generation strategy.

The VSG controller 80 also includes turbine controller means, such as a turbine controller 110, for receiving and processing the real power sensor signal $P_{eo}$ from the real power sensor 84, and the real power demand signal from the real power reference means 108, to produce a turbine controller signal. The turbine controller signal is the second input required by the turbine efficiency maximizer 102.

The energy conversion generation system 28 also includes resource energy adjustment means (not shown) for receiving the turbine controller signal and for controlling the resource energy received by the prime mover 36 in response to the turbine controller signal. In this manner, the resource energy $P_{ti}$ converted into mechanical energy $P_T$ by the prime mover 36 is controlled.

In the hydro example of FIG. 1, the resource energy adjustment means comprises a gate means (not shown) for closing the hydro inlet of hydro turbine 36 in response to the turbine controller signal. The turbine controller signal comprises a gate position signal g. In this embodiment, the turbine efficiency maximizer means 102 receives and processes the head sensor signal H and the gate position signal g to produce the hydro turbine efficiency output signal.

For a wind turbine (not shown), the turbine controller produces a wind turbine controller signal which comprises a blade pitch adjustment signal. For a wind turbine having adjustable blades with an adjustable pitch angle, the resource energy adjustment means comprises means for adjusting the pitch angle of the blades in response to the blade pitch adjustment signal. A wind turbine efficiency maximizer receives and processes the wind speed sensor signal and the blade pitch adjustment signal to produce a wind turbine efficiency output signal.

The turbine controller 110 includes real power comparator means, such as a real power comparator 112, for comparing the real power sensor signal $P_{eo}$ from the real power sensor 84 with the real power demand signal $P_{eo,REF}$ from the real power reference means 108. From comparing these signals, the real power comparator 112 produces a differential real power output signal X which is representative of the difference between the real power sensor signal and the real power demand signal. In the illustrated example, the real power demand signal $P_{eo,REF}$ has a positive (+) value, and the real power sensor signal $P_{eo}$ has a negative (−) value.

The turbine controller 110 also includes oscillation limiter means, such as a deadband controller 114, for limiting undesirable oscillations of the turbine controller signal within deadband limits by producing a deadband output signal Y. The deadband controller 114 avoids undesirable oscillations of the real power component of the electrical power output to grid 34.

The turbine controller 110 further includes turbine power subcontroller means, such as turbine power subcontroller 116, for setting the resource energy adjustment means, such as the gate position for a hydro turbine. The resource energy adjustment means is set to provide a real power component of the electrical output power to the grid which corresponds to the real power demand signal. Such turbine power subcontrollers are commercially available, for example, electrohydraulic governors are commonly used.

The turbine controller 110 also includes excitation limiter means, such as excitation limiter 118, for limiting the turbine controller signal to a maximum value. The excitation limiter 118 receives an input from the output of the turbine power subcontroller 116. For the hydro turbine example of FIG. 1, the turbine controller signal g is limited to a maximum value of $g_{max}$. The excitation limiter 118 limits the excitation requirement to moderate levels, which allows maximum efficiency operation at over a wide variation margin of resource conditions or electrical load conditions.

Figure 20:
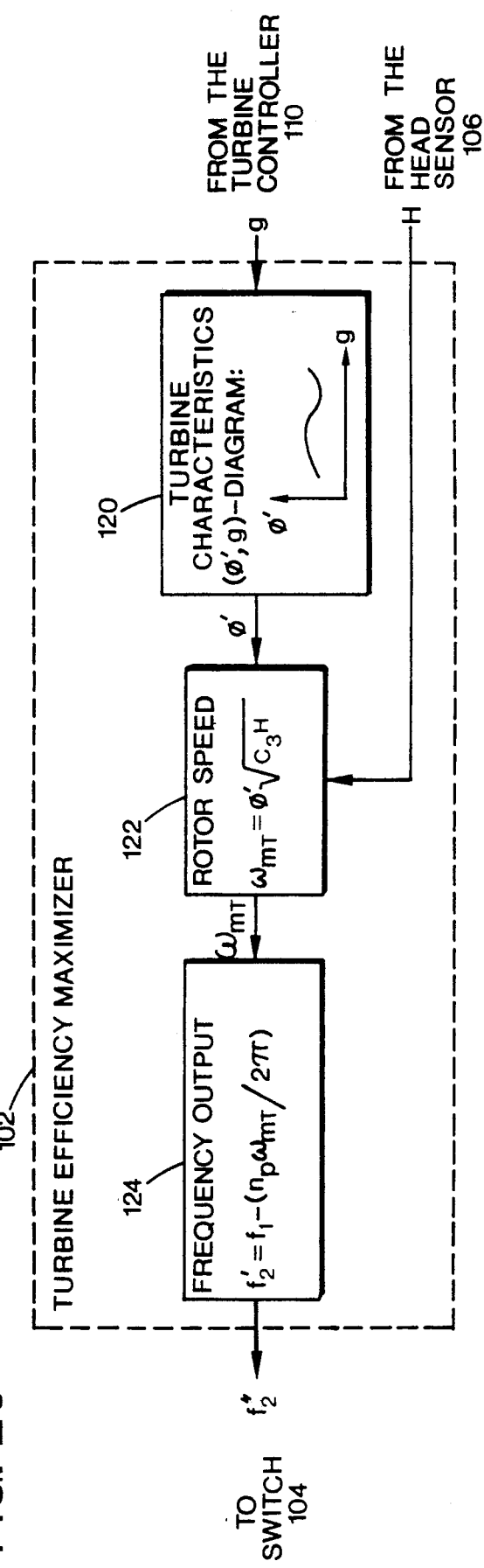
FIG. 20 is a block diagram of one form of a turbine efficiency maximizer of the present invention.

Now that the production of the inputs H and g to the turbine efficiency maximizer 102 are understood, an illustrated embodiment of the turbine efficiency maximizer 102 will be explained with reference to FIG. 20. The turbine efficiency maximizer 102 includes turbine characteristics storage means, illustrated as a turbine characteristics block 120, for storing the input/output characteristics of the prime mover 36. The turbine characteristics diagram shown in block 120 depicts the points of maximum efficiency of a prime mover for a given gate position. The turbine characteristics storage means 120 includes matching means for matching the turbine controller signal g with the input/output prime mover characteristics to produce a prime mover characteristic output signal $\phi'$ for maximum efficiency of the turbine.

The turbine efficiency maximizer 102 also includes rotor speed controller means, such as the rotor speed block 122, for determining the angular rotor speed $w_{mT}$ required for maximum prime mover efficiency. The rotor speed block 122 receives and the prime mover input sensor signal, H for the hydro turbine, and the turbine characteristics output signal $\phi'$. From these inputs the angular rotor speed required for maximum turbine efficiency is determined according to the equation:

$$w_{mT} = \phi'(c_3 H)^{\frac{1}{2}}.$$

The constant $c_3$ reflects a physical parameter of the prime mover used in a particular application. The precise value of this constant is available from the prime mover manufacturer, however this value is not critical to practicing the principles of this invention.

The turbine efficiency maximizer 102 includes frequency output means 124 for producing the turbine efficiency output signal $f_2''$. The turbine efficiency output signal is determined from the output of the rotor speed block 122 according to the equation:

$$f_2'' = f_1 - [(n_p)(w_{mT})/2\pi].$$

A typical source for the signal generator 100, 100' was given above. Otherwise, the functions performed by the various components of the VSG controller 80, 80' may be implemented using analog and/or digital processing techniques and signal processors.

The various components of the energy conversion generation systems 28 and 28', such as the converters 40 and 40', the generator 50, the sensors 82, 84 and 106, and the VSG controllers 80 and 80' (with or without the turbine controller 110 and the turbine efficiency maximizer 102), may be supplied in a variety of different packages.

For example, a frequency source generator could be supplied for a monitored turbine-generator set already having sensors 82, 84 and 106. In this case, such a frequency source generator comprises the controller means, such as the VSG controller 80 or 80', and converter means, such as converter 40 or 40'. The converter means is provided for converting power received from a converter power source into excitation power at a controlled excitation frequency in response to the converter controller signal produced by the controller means. The converter means is also provided for injecting the excitation power at the excitation frequency into a second stator system 56 of the generator 50.

In another case, a variable speed generation system controller 80 or 80', is supplied for a variable speed generation system having a converter, a generator, a turbine and sensors, such as 82, 84 and 106.

As a further example, a generator system may be supplied for receiving mechanical energy from a prime mover 36 according to a controller signal received from an external controller. In this case, such a generator system comprises converter means, such as converter 40 or 40', and a brushless doubly-fed generator 50.

The associated method of converting resource energy from a resource 32 into electrical power for supply to a polyphase electric power grid 34 comprises several steps. This process includes the step of driving a prime mover 36 using resource energy received from the resource 32, and then in turn driving a brushless doubly-fed generator 50 using the prime mover 36.

In a monitoring step, a parameter of the electrical power supplied to the grid 34 is monitored, and a first power output sensor signal is produced that corresponds to the monitored parameter. As described above, this monitored parameter may be the reactive power component and/or the real power component of the electrical power output monitored by sensor 82 and/or sensor 84, respectively.

In an establishing step, a reference signal is established according to a desired power generation strategy. In the illustrated embodiment, two reference means 88 and 90 are provided for establishing respectively a reactive power reference signal and a reference generator speed signal.

In a receiving and processing step, the reactive power sensor signal and the reference signal are received and processed to produce a controller signal. In greater detail, the receiving and processing steps comprise the steps of comparing the reactive power sensor signal with the reactive power reference signal using the reactive power comparator 94, and producing therefrom a differential reactive power output signal which is representative of the difference between the reactive power sensor signal and the reactive power reference signal.

This processing step further includes the steps of delaying the differential reactive power output signal to produce an amplitude component signal, and of generating the controller signal from the amplitude component signal and the reference speed signal which comprises a frequency component signal. In this manner, a controller signal is generated which corresponds to the amplitude and frequency component signals.

In a converting step, power is received from a converter power source and converted into excitation power at an excitation frequency in response to the controller signal. In an injecting step, the excitation power is injected or applied at the excitation frequency into the second stator system 56 of generator 50. Finally, in a supplying step, the electrical power output generated by the energy conversion system 28 is supplied to the grid 34 at the system frequency $f_1$ of the grid from the first stator system 54 of generator 50.

This converting method may be further refined by including steps to maximize the prime mover efficiency. In such refinements, the monitoring step comprises monitoring an input parameter of the resource energy, such as the pressure head for a hydro turbine using head sensor 106, and producing therefrom a prime mover input sensor signal corresponding to the monitored input parameter. The establishing step further comprises a step of establishing a real power demand signal, using reference means 108, according to a desired real power component of the electrical power output supplied to the grid. The processing step further comprises the steps of receiving and processing the real power sensor signal from sensor 84 and the real power demand signal from reference means 108, and producing therefrom a turbine controller signal g using the turbine controller 110. The processing step also includes the step of maximizing the prime mover efficiency by receiving and processing the prime mover input sensor signal, such as head signal H from sensor 106, and the turbine controller signal g, and producing therefrom a turbine efficiency output signal $f_2''$. This method further includes the step of selecting either the turbine efficiency maximizer output signal $f_2''$ or the reference speed signal $f_2'$ to serve as the frequency component signal $f_2$, which is used to generate the controller signal.

Further refinements of such methods are applicable for converting hydro resource energy and wind resource energy into electrical power.

For example, where the resource is hydro having a pressure head and the prime mover is a hydro turbine having a hydro inlet, the resource energy adjustment means comprises a positionable gate for closing the hydro inlet. In this example, the monitoring step includes monitoring an input parameter of the hydro resource comprising the pressure head and producing a pressure head sensor signal. The processing step includes producing a turbine controller signal comprising a gate position signal. The maximizing step includes receiving and processing the pressure head sensor signal and the gate position signal. The step of adjusting the resource energy adjustment means includes adjusting the gate position in response to the gate position signal.

Where the resource is wind having a wind speed and the prime mover is a wind turbine having adjustable blades, the resource energy adjustment means comprises the blades having an adjustable pitch angle for varying the force of impact of the wind on the blades. In this example, the monitoring step includes monitoring an input parameter of the wind comprising the wind speed and producing a wind speed sensor signal. The processing step includes producing a turbine control signal comprising a blade pitch adjustment signal. The maximizing step includes receiving and processing the wind speed sensor signal and the blade pitch adjustment signal. The step of adjusting the resource energy adjustment means includes adjusting the pitch angle of the blades in response to the blade pitch adjustment signal.

Another method is also provided for controlling a variable speed generation system having a brushless doubly-fed generator 50, a converter 40 or 40' and a prime mover 36. This method comprises the steps of monitoring an output parameter of the electrical power output of the generation system and producing an output parameter signal corresponding to the monitored output parameter, such as the reactive power output $Q_{eo}$. In an establishing step, a reference signal is established according to a desired power generator strategy. In a receiving and processing step, the output parameter signal and the reference signal are received and processed to produce a controller signal having amplitude and frequency components. In an applying step, the controller signal is applied to the converter to control the amplitude and frequency of the excitation power supplied to the second stator system 56 of generator 50.

In summary, the brushless doubly-fed machine operates in a synchronous mode and in an induction mode. Operation in a synchronous mode yields many significant advantages over operation in the induction mode and over other generation systems. For example, the machine efficiency in the synchronous mode is higher than in the induction mode. In a certain speed range, the first and second stator systems produce opposing torques in the induction mode, but not in the synchronous mode. With the first stator system 54 connected directly to a power grid of a fixed frequency $f_1$, the shaft speed in the synchronous mode is varied by varying the frequency $f_2$ of the second stator system excitation power.

Moreover, in the synchronous mode, the RPM value of the shaft speed is predicted by the equation:

$$RPM = (60)[(f_1 - f_2)/(n_1 + n_2)].$$

Thus, it is apparent that a tachometer signal feedback is not required to control the shaft speed in a synchronous mode. Since the shaft speed is locked by the supply frequencies $f_1$ and $f_2$, the efficiency maximization process is significantly expedited in a variable speed generation system. Thus, it is apparent that a tachometer signal feedback is not required to control the shaft speed in a synchronous mode. In the induction mode, the RPM value of the shaft speed is dependent upon the characteristics of the prime mover 36.

When compared with synchronous machines, the brushless doubly-fed machine of the present invention is simpler to synchronize than the conventional synchronous machine. When such a conventional synchronous machine loses synchronism, severe oscillations are encountered which ultimately require the system to be shut down prior to resynchronization. If a brushless doubly-fed machine loses synchronism, system shut down is not required because the machine merely enters an induction mode of operation.

Having illustrated and described the principles of my invention with respect to the preferred embodiments, it should be apparent to those skilled in the art that my invention may be modified in arrangement and detail without departing from such principles. For example, the brushless doubly-fed machine may be connected to a grid operating at a system frequency other than 60 Hertz. For example, the system of the present invention could be used in a relatively isolated environment having a grid operating other system frequencies, for example 400 Hertz. I claim all such modifications falling within the scope and spirit of the following claims.

I claim:

1. An energy conversion generation system for receiving resource energy from a resource and converting the resource energy into an electrical power output for supply to a polyphase electric power grid operating a&: a system frequency, the energy conversion generation system comprising:
   a prime mover driven by the resource energy;
   converter means for producing excitation power from power received from a converter power source;
   a brushless doubly-fed generator having a rotor with rotor windings and a stator with stator windings comprising first and second polyphase stator systems, the rotor coupled to and driven by the prime mover, the first stator system being electrically connected to the electric power grid for supplying the electrical power output, and the second stator system being electrically connected to the converter means for receiving the excitation power;
   sensor means for sensing a parameter of the electrical power output supplied to the grid and for producing a sensor signal that corresponds to the sensed parameter; and
   controller means for controlling the converter means in response to the sensor signal, the controller means including reference means for establishing a reference signal and processing means for processing the sensor signal and the reference signal to produce a controller signal;
   the converter means being constructed to produce the excitation power at an excitation frequency in response to the controller signal so as to increase the ratio of the electrical power output to the resource energy power input received by the prime mover.

2. An energy conversion generation system according to claim 1 wherein the sensor means comprises reactive power sensor means for sensing a reactive power component of the electrical power output and producing a sensor signal comprising reactive power sensor signal.

3. An energy conversion generation system according to claim 2 wherein the reference means comprises reactive power reference means for establishing a reactive power reference signal corresponding to a desired reactive power component of the electrical power output.

4. An energy conversion generation system according to claim 3 wherein the reference means further comprises speed reference means for establishing a reference speed signal corresponding to a desired generator speed.

5. An energy conversion generation system according to claim 4 wherein the controller means further comprises:
   comparator means for comparing the reactive power sensor signal with the reactive power reference signal to produce a differential reactive power output signal representative of the difference between reactive power sensor signal and the reactive power reference signal; and
   signal generator means for generating the controller signal in response to the reference speed signal and the differential reactive power output signal.

6. An energy conversion generation system according to claim 5 wherein the controller means further includes stabilizer means for stabilizing the system and producing an amplitude component signal, the stabilizer means comprising said comparator means and delay means for delaying the differential reactive power output signal.

7. An energy conversion generation system according to claim 6 wherein:
   the reference speed signal comprises a frequency component signal; and
   the signal generator means receives the amplitude component signal and the frequency component signal to generate the controller signal having amplitude and frequency components corresponding to the respective amplitude component signal and the frequency component signal.

8. An energy conversion generation system according to claim 7 wherein the controller means further includes:
   turbine efficiency maximizer means for maximizing the efficiency of the prime mover and producing a turbine efficiency output signal; and
   switching means for selecting one of the turbine efficiency output signal and the reference speed signal to serve as the frequency component signal.

9. An energy conversion generation system according to claim 8 wherein:
   the system further comprises prime mover input sensor means for sensing an input parameter of the resource energy received by the prime mover from the resource and producing a prime mover input sensor signal corresponding to the sensed input parameter, and real power sensor means for sensing a real component of the electrical power output and producing a real power sensor signal corresponding to the sensed real component;
   the controller means further includes power demand reference means for establishing a real power demand signal, and turbine controller means for receiving and processing the real power sensor signal and the real power demand signal to produce a turbine controller signal; and
   the turbine efficiency maximizer means is constructed to receive and process the prime mover input sensor signal and the turbine controller signal to produce the turbine efficiency output signal.

10. An energy conversion generation system according to claim 9 further including resource energy adjustment means for receiving the turbine controller signal and for controlling the resource energy received by the prime mover in response to the turbine controller signal, thereby controlling the resource energy converted into mechanical energy by the prime mover.

11. An energy conversion generation system according to claim 10 wherein:
   the resource is hydro;
   the prime mover comprises a hydro turbine having a hydro inlet;
   the prime mover input sensor means comprises head sensor means for sensing an input parameter comprising a pressure head and producing a head sensor signal;

the turbine controller signal comprises a gate position signal;

the resource energy adjustment means comprises gate means for closing the hydro inlet in response to the gate position signal; and the turbine efficiency maximizer means receives and processes the head sensor signal and the gate position signal to produce the turbine efficiency output signal.

12. An energy conversion generation system according to claim 10 wherein:

the resource is wind having a wind speed;

the prime mover comprises a wind turbine having adjustable blades with an adjustable pitch angle;

the prime mover input sensor means comprises wind speed sensor means for sensing an input parameter comprising the wind speed and producing a wind speed sensor signal;

the turbine controller signal comprises a blade pitch adjustment signal;

the resource energy adjustment means comprises means for adjusting the pitch angle of the blades in response to the blade pitch adjustment signal; and the turbine efficiency maximizer means receives and processes the wind speed sensor signal and the blade pitch adjustment signal to produce the turbine efficiency output signal.

13. An energy conversion system according to claim 1 further comprising tapping means for tapping a portion of the electrical power output to serve as the converter power source.

14. An energy conversion generation system according to claim 3 wherein:

the system further comprises prime mover input sensor means for sensing an input parameter of the resource energy supplied to the prime mover by the resource and producing a prime mover input sensor signal corresponding to the sensed input parameter;

the system further comprises output power sensor means for sensing a real component of the electrical power output and producing a real power sensor signal corresponding to the sensed real component;

the controller means further includes comparator means, delay means, power demand reference means, turbine controller means, turbine efficiency maximizer means and signal generator means, wherein:

a. the comparator means for comparing the reactive power sensor signal with the reactive power reference signal to produce a differential reactive power output signal representative of the difference between reactive power sensor signal and the reactive power reference signal, b. delay means for delaying the differential reactive power output signal and producing an amplitude component signal, c. power demand reference means for establishing a real power demand signal, d. turbine controller means for receiving and processing the real power sensor signal and the real power demand signal to produce a turbine controller signal, and e. turbine efficiency maximizer means for receiving and processing the prime mover input sensor signal and the turbine controller signal to produce a frequency component signal; and the signal generator receives the amplitude component signal and the frequency component signal to generate the controller signal having amplitude and frequency components corresponding to the respective amplitude component signal and the frequency component signal.

15. A method of converting resource energy from a resource into electrical power for supply to a polyphase electric power grid operating at a system frequency, comprising the steps of:

driving a prime mover using resource energy from a resource;

driving a brushless doubly-fed generator using the prime mover, the brushless doubly-fed generator having a rotor with rotor windings and a stator with stator windings comprising first and second polyphase stator systems, the first stator system being connected to the grid;

monitoring a parameter of the electrical power supplied to the grid and producing a first output power sensor signal that corresponds to the monitored parameter;

establishing a reference signal according to a desired power generation strategy;

receiving and processing the first output power sensor signal and the reference signal to produce a controller signal;

converting power received from a converter power source into excitation power at an excitation frequency in response to the controller signal;

injecting the excitation power at the excitation frequency into the second stator system; and supplying an electrical power output to the grid at the system frequency from the first stator system.

16. A method of converting resource energy according to claim 15 wherein:

the monitoring step comprises monitoring a reactive power component of the electrical power output;

the first output power sensor signal comprises a reactive power sensor signal;

the establishing step comprises establishing a reactive power reference signal corresponding to a desired reactive power component of the electrical power output; and the processing step comprises the steps of comparing the reactive power sensor signal with the reactive power reference signal and producing a differential reactive power output signal representative of the difference between reactive power sensor signal and the reactive power reference signal.

17. A method of converting resource energy according to claim 16 wherein:

the establishing step further comprises establishing a reference speed signal corresponding to a desired generator speed, the reference speed signal comprising a frequency component signal; and the processing step further comprises the steps of delaying the differential reactive power output signal to produce an amplitude component signal, and generating the controller signal from the amplitude component signal and the frequency component signal to produce a controller signal having respective corresponding amplitude and frequency components.

18. A method of converting resource energy according to claim 17 wherein:

the monitoring step further comprises monitoring an input parameter of the resource energy received by the prime mover from the resource, producing a prime mover input sensor signal corresponding to the monitored input parameter, monitoring a real component of the electrical power output, and producing a real power sensor signal;

the establishing step further comprises establishing a real power demand signal corresponding to a desired real power component of the electrical power output;

the processing step further comprises the steps of receiving and processing the real power sensor signal and the real power demand signal, producing therefrom a turbine controller signal, maximizing the prime mover efficiency by receiving and processing the prime mover input sensor signal and the turbine controller signal and producing therefrom a turbine efficiency output signal comprising a frequency component signal; and the method further comprises selecting one of the turbine efficiency maximizer output signal and the reference speed signal to serve as the frequency component signal used in the step of generating the controller signal.

19. A method according to claim 18 of converting resource energy using a prime mover having resource energy adjustment means for limiting the resource energy received by the prime mover, the method further including the step of adjusting the resource energy adjustment means in response to the turbine controller signal to control the resource energy received by the prime mover.

20. A method of converting resource energy according to claim 19 wherein:

the resource is hydro having a pressure head;

the prime mover comprises a hydro turbine having a hydro inlet;

the resource energy adjustment means comprises a positionable gate for closing the hydro inlet;

the monitoring step comprises monitoring an input parameter of the hydro comprising the pressure head and producing a pressure head sensor signal;

the processing step comprises the steps of producing a turbine controller signal comprising a gate position signal;

the maximizing step comprises receiving and processing the pressure head sensor signal and the gate position signal; and the step of adjusting the resource energy adjustment means comprises adjusting the gate position in response to the gate position signal.

21. A method of converting resource energy according to claim 19 wherein:

the resource is wind having a wind speed;

the prime mover comprises a wind turbine having adjustable blades;

the resource energy adjustment means comprises the blades having an adjustable pitch angle for varying the force of impact of the wind on the blades;

the monitoring step comprises monitoring an input parameter of the wind comprising the wind speed and producing a wind speed sensor signal;

the processing step comprises the steps of producing a turbine control signal comprising a blade pitch adjustment signal;

the maximizing step comprises receiving and processing the wind speed sensor signal and the blade pitch adjustment signal; and the step of adjusting the resource energy adjustment means comprises adjusting the pitch angle of the blades in response to the blade pitch adjustment signal.

22. A frequency source generator for a monitored turbine-generator set generating an electrical power output for supply to an electrical power grid operating at a system frequency, the set having a turbine coupled to and driving a generator, the turbine receiving resource energy from a resource, the generator having a brushless rotor unit and a stator unit with stator windings comprising first and second polyphase stator systems, the first stator system supplying the electrical power output to the grid, the set including monitoring means for monitoring input and output parameters of the turbine-generator set comprising reactive power sensing means for sensing a reactive power component of the electrical power output and for producing a reactive power sensor signal corresponding to the sensed reactive power component, the frequency source generator comprising:

controller means comprising reference means for establishing a reference signal, the controller means being for receiving the reactive power sensor signal, and for processing the reactive power sensor signal with the reference signal to produce a converter controller signal; and converter means for receiving the converter controller signal and for converting power received from a converter power source into excitation power at a controlled excitation frequency in response to the converter controller signal, and for injecting the excitation power at the excitation frequency into the second stator system.

23. A variable speed generation system controller for controlling a variable speed generation system which converts resource energy received from a resource into electrical power for supply to an electrical power grid operating at a system frequency, the generation system having a reactive power sensor which senses a reactive power component of the electric power supplied to the grid and which produces a reactive power sensor signal corresponding to the sensed reactive power component, and a converter which converts power from a converter power source into excitation power, a prime mover which is driven by the resource energy, a brushless doubly-fed generator having a rotor and a stator, the rotor coupled to and driven by the prime mover, the rotor having rotor windings, the stator having stator windings comprising first and second polyphase stator systems, the first stator system for supplying an electrical power output to the grid, and the second stator system receiving the excitation power from the converter, the system controller comprising converter controller means that include reference means for establishing a reference signal according to a desired power generation strategy;

the converter controller means is constructed to receive and process the reactive power sensor signal with the reference signal to produce a controller signal;

the converter is responsive to the controller signal so as to supply a desired electrical power output to the grid irrespective of variations in the resource energy.

24. A variable speed generation system controller according to claim 23 wherein:

a. the reference means comprises:

(1) reactive power reference means for establishing a reactive power reference signal corresponding to a desired reactive power component of the electrical power output, and (2) speed reference means for establishing a reference speed signal corresponding to a desired generator speed, the reference speed signal comprising a frequency component signal; and b. the converter controller further comprises:

(1) stabilizer means for stabilizing the system having:

(a) the comparator means for receiving and comparing the reactive power sensor signal and the reactive power reference signal to produce a differential reactive power output signal representative of the difference between reactive power sensor signal and the reactive power reference signal, and (b) delay means for receiving and delaying the differential reactive power output signal to produce an amplitude component signal; and (2) signal generator means for the amplitude component signal and the frequency component signal and producing therefrom the controller signal having corresponding respective amplitude and frequency components.

25. A variable speed generation system controller according to claim 24 wherein the converter controller further comprises:

turbine efficiency maximizer means for maximizing the efficiency of the prime mover and producing a turbine efficiency frequency component signal; and switching means for selecting one of the turbine efficiency frequency component signal and the frequency component signal from the speed reference means to serve as the frequency component signal received by the signal generator means.

26. A variable speed generation system controller according to claim 25 for a variable speed generation system having a real power sensor which senses a real power component of the electric power supplied to the grid and which produces a real power sensor signal corresponding to the sensed real power component, the prime mover having resource energy adjustment means for limiting the resource energy received by the prime mover, the system controller further comprising:

power demand reference means for establishing a real power demand signal corresponding to a desired real power component of the electrical power output; and turbine controller means for receiving and processing the real power sensor signal and the real power demand signal and producing a turbine controller signal, the adjustable turbine setting being responsive to the turbine controller signal to control the resource energy received by the prime mover.

27. A variable speed generation system controller according to claim 26 wherein:

the variable speed generation system has a turbine input parameter sensor which senses an input parameter of the resource energy received by the prime mover and which produces a turbine input sensor signal corresponding to the sensed input parameter; and the turbine efficiency maximizer means receives and processes the turbine input sensor signal and the turbine controller signal to produce the turbine efficiency frequency component signal.

28. A method of controlling a variable speed generation system having a brushless doubly-fed generator, a converter and a prime mover, the generator having a rotor with rotor windings and a stator with stator windings comprising first and second polyphase stator systems, the converter converting power received from a converter power source into excitation power, the prime mover driven by the resource energy received from a resource, the rotor being mechanically coupled to and driven by the prime mover, the first stator system supplying an electrical power output to a polyphase electric power grid operating at a system frequency, the second stator system receiving the excitation power from the converter, the method comprising the steps of:

monitoring an output parameter of the electrical power output of the generation system and producing an output parameter signal corresponding to the monitored output parameter;

establishing a reference signal according to a desired power generation strategy;

receiving and processing the output parameter signal with the reference signal to produce a controller signal having amplitude and frequency components; and applying the controller signal to the converter to control the amplitude and frequency of the excitation power.

29. A generator system for receiving mechanical energy from a prime mover which is driven by resource energy received from a resource, and for generating from the received mechanical energy an electrical power output according to a control signal for supply to a polyphase electric power grid operating at a system frequency, the control signal produced by a controller which receives and processes a generator output signal from a generator output sensor with a reference signal to produce the control signal, the generator system comprising:

converter means for receiving the control signal and power from a converter power source, and for converting the received power in response to the control signal into excitation power of variable frequency and amplitude; and a generator having a brushless rotor unit with rotor windings and a stator unit with stator windings comprising first and second polyphase stator systems, the rotor being mechanically coupled to and driven by the prime mover, the second stator system receiving the excitation power from the converter means, and the first stator system supplying the electrical power output to the grid according to the controller signal.

30. A generator system according to claim 29 wherein the converter means comprises a power electronic converter.

31. A generator system according to claim 30 wherein the power electronic converter is operable in a controllable current source mode.

32. A generator system according to claim 30 wherein the power electronic converter is operable in a controllable voltage source mode.

33. A generator system according to claim 30 wherein:

the first and second stator systems have common shared stator windings; and the rotor windings comprise a plurality of rotor bars equally spaced about the periphery of the rotor, and at least two rotor winding groups, each rotor winding group lying between two adjacent rotor bars and comprising at least one shorted rotor coil.

34. A generator system according to claim 33 wherein:

the first and second stator systems have a respective first and second number of pole-pairs with each pole-pair comprising two poles;

the second stator system has at least two poles; and the first stator system has at least four more poles than the second stator system.

35. A generator system according to claim 34 wherein the number of rotor bars is the sum of the first and second number of pole-pairs of the respective first and second stator systems.

* * * * *

UNITED STATES PATENT AND TRADEMARK OFFICE
CERTIFICATE OF CORRECTION

PATENT NO. : 5,028,804
DATED : July 2, 1991
INVENTOR(S) : HIAN K. LAUW

It is certified that error appears in the above-identified patent and that said Letters Patent is hereby corrected as shown below:

Column 18, line 54, both occurrences of "$f_1$" should be --$f_{r1}$--.

Column 19, line 38, "counterclockwise" should be --counter-clockwise--.

Column 19, lines 65-66, the phrase "are fixed, the rotor frequencies $f_{r1}$" should not be italicized.

Column 20, line 6, delete the comma (",").

Column 23, line 29, delete the period (".").

Column 24, line 65, $V_2/s=+(I_2)$ . . ." should be --$\overline{V}_2/s=+(\overline{I}_2)$ . . .--

Column 25, line 43, delete the period (".").

Column 25, line 56, "$\overline{V}_w$ . . ." should be --$\overline{V}_2$. . .--.

UNITED STATES PATENT AND TRADEMARK OFFICE
CERTIFICATE OF CORRECTION

PATENT NO. : 5,028,804

DATED : July 2, 1991

INVENTOR(S) : Hian K. Lauw

It is certified that error appears in the above-identified patent and that said Letters Patent is hereby corrected as shown below:

Column 27, line 22, "...$P_{ag1}32$..." should be --...$P_{ag1}=$...--.

Column 28, line 50, "...$R_1^{TH}$..." should be --...$R_1^{Th}$...--.

Column 32, line 57, "$I_2$" should be --In--.

Column 33, line 26, "diagrams s" should be --diagrams as--.

Column 41, line 13, "a&:" should be --at--.

Column 41, line 49, after "comprising" add --a--.

Column 47, line 22, after "for" add --receiving--.

Signed and Sealed this

Sixteenth Day of February, 1993

*Attest:*

STEPHEN G. KUNIN

*Attesting Officer*     *Acting Commissioner of Patents and Trademarks*